(12) United States Patent
Yin

(10) Patent No.: US 9,215,039 B2
(45) Date of Patent: Dec. 15, 2015

(54) DEVICES FOR ENABLING HALF-DUPLEX COMMUNICATION

(75) Inventor: Zhanping Yin, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 520 days.

(21) Appl. No.: 13/427,755

(22) Filed: Mar. 22, 2012

(65) Prior Publication Data

US 2013/0250772 A1 Sep. 26, 2013

(51) Int. Cl.
*H01R 31/08* (2006.01)
*H04L 1/18* (2006.01)
*H04L 5/16* (2006.01)
*H04W 4/00* (2009.01)

(52) U.S. Cl.
CPC ............. *H04L 1/1822* (2013.01); *H04L 5/16* (2013.01); *H04W 4/005* (2013.01)

(58) Field of Classification Search
CPC .............. H04L 5/16; H04J 3/00; H04W 24/00
USPC .................... 370/252–253, 281–339; 375/220
See application file for complete search history.

(56) References Cited

U.S. PATENT DOCUMENTS

| | | | |
|---|---|---|---|
| 2009/0122731 A1 | 5/2009 | Montojo et al. | |
| 2009/0135748 A1* | 5/2009 | Lindoff et al. | 370/296 |
| 2009/0296609 A1 | 12/2009 | Choi et al. | |
| 2010/0008332 A1 | 1/2010 | Balachandran et al. | |
| 2010/0085901 A1 | 4/2010 | Womack et al. | |
| 2011/0149813 A1 | 6/2011 | Parkvall et al. | |
| 2011/0176461 A1 | 7/2011 | Astely et al. | |
| 2011/0268046 A1 | 11/2011 | Choi et al. | |
| 2012/0207040 A1* | 8/2012 | Comsa et al. | 370/252 |
| 2013/0083753 A1* | 4/2013 | Lee et al. | 370/329 |
| 2014/0064233 A1* | 3/2014 | Oizumi et al. | 370/329 |

OTHER PUBLICATIONS

Ericsson, ST-Ericsson, "Standards Aspects Impacting UE Costs," 3GPP TSG RAN WG1 Meeting #66bis, R1-112929, Oct. 2011.
Potevio, "Signaling for CSI-RS Configuration," 3GPP TSG RAN WG1 Meeting #62bis, R1-105231, Oct. 2010.
Ericsson, "Draft Reply LS on Uplink Coverage for LTE," 3GPP TSG-RAN WG1 #51BIS, R1-080532, Jan. 2008.
International Search Report issued for International Application No. PCT/JP2013/000960 on May 14, 2013.
Huawei, HiSilicon, "Consideration on HD-FDD for Low-Cost MTC UE," 3GPP TSG RAN WG1 Meeting #68, R1-120055, Feb. 2012.

(Continued)

*Primary Examiner* — Iqbal Zaidi
(74) *Attorney, Agent, or Firm* — Austin Rapp & Hardman

(57) ABSTRACT

A wireless communication device for enabling half-duplex communication is described. The wireless communication device includes a processor and instructions stored in memory that is in electronic communication with the processor. The wireless communication device receives an indicator. The wireless communication device also determines a half-duplex frame structure with a regular uplink (UL) and downlink (DL) switching pattern based on the indicator. The half-duplex frame structure includes at least one UL subframe group including one or multiple consecutive UL subframes and at least one DL subframe group including one or multiple consecutive DL subframes. The wireless communication device further receives DL information in at least one of the DL subframes. The wireless communication device additionally sends UL information in at least one of the UL subframes.

30 Claims, 16 Drawing Sheets

(56) References Cited

OTHER PUBLICATIONS

Ericsson, ST-Ericsson, "Evaluation/Analysis of Half Duplex Operation for Low-Cost MTC," 3GPP TSG-RAN WG1 #68, R1-120216, Feb. 2012.
Qualcomm Incorporated, "Impact of Half Duplex Operation on MTC," 3GPP TSG-RAN WG1 #68, R1-120567, Feb. 2012.
MediaTek Inc., "Analysis of Half Duplex Operation," 3GPP TSG-RAN WG1 #68, R1-120635, Feb. 2012.
Nokia Siemens Networks, Nokia, "Analysis of Half Duplex Operation for Low-Cost MTC UE," 3GPP TSG RAN WG1 #68, R1-120740, Feb. 2012.
3GPP TS 36.211 V9.0.0, "Evolved Universal Terrestrial Radio Access (E-UTRA); Physical Channels and Modulation (Release 9)," Dec. 2009.
3GPP TS 36.213 V8.6.0, "Evolved Universal Terrestrial Radio Access (E-UTRA); Physical Layer Procedures (Release 8)," Mar. 2009.
3GPP TS 36.331 V9.1.0, "Evolved Universal Terrestrial Radio Access (E-UTRA) Radio Resource Control (RRC); Protocol Specification (Release 9)," Dec. 2009.
3GPP TS 36.212 V9.0.0, "Evolved Universal Terrestrial Radio Access (E-UTRA); Multiplexing and Channel Coding (Release 9)," Dec. 2009.
Vodafone, "Proposed SID: Provision of Low-Cost MTC UEs Based on LTE," TSG RAN Meeting #53, RP-111112, Sep. 2011.
MCC Support, "Final Report of 3GPP TSG RAN WG1 #66bis v1.1.0," 3GPP TSG RAN WG1 Meeting #67, R1-114352, Nov. 2011.
MCC Support, "Final Report of 3GPP TSG RAN WG1 #67 v1.0.0," 3GPP TSG RAN WG1 Meeting #68, R1-120001, Feb. 2012.
MCC Support, "Draft Report of 3GPP TSG RAN WG1 #68 v0.1.0," 3GPP TSG RAN WG1 Meeting #68, R1-12xxxx, Mar. 2012.
Ericsson et al., "Half Duplex FDD in LTE", 3GPP Draft, R1-080534, Sevilla, Spain, Jan. 19, 2008.
InterDigital Communications, LLL, "Analysis of Half-duplex FDD for Low-cost UE's", 3GPP Draft, R1-121323, Jeju, Korea, Mar. 20, 2012.

* cited by examiner

DEVICES FOR ENABLING HALF-DUPLEX COMMUNICATION

TECHNICAL FIELD

The present disclosure relates generally to communication systems. More specifically, the present disclosure relates to devices for enabling half-duplex communication.

BACKGROUND

Wireless communication devices have become smaller and more powerful. Wireless communication devices are increasingly expected to provide reliable service, expanded areas of coverage and increased functionality. A wireless communication system may provide communication for a number of wireless communication devices, each of which may be serviced by a base station. A base station may be a fixed station that communicates with wireless communication devices.

As wireless communication devices have become more advanced, the potential uses of wireless communication devices have also increased. One such advancement is the introduction of machine-to-machine (M2M) devices. These devices may provide little or no human interface. Nevertheless, these devices may provide a wireless link to a base station.

Wireless communication devices may communicate with one or more devices using a communication structure. However, some communication structures may not be well suited to all applications. As illustrated by this discussion, systems and methods that provide a suitable communication structure for an operating context may be beneficial.

DETAILED DESCRIPTION

Figure 1:
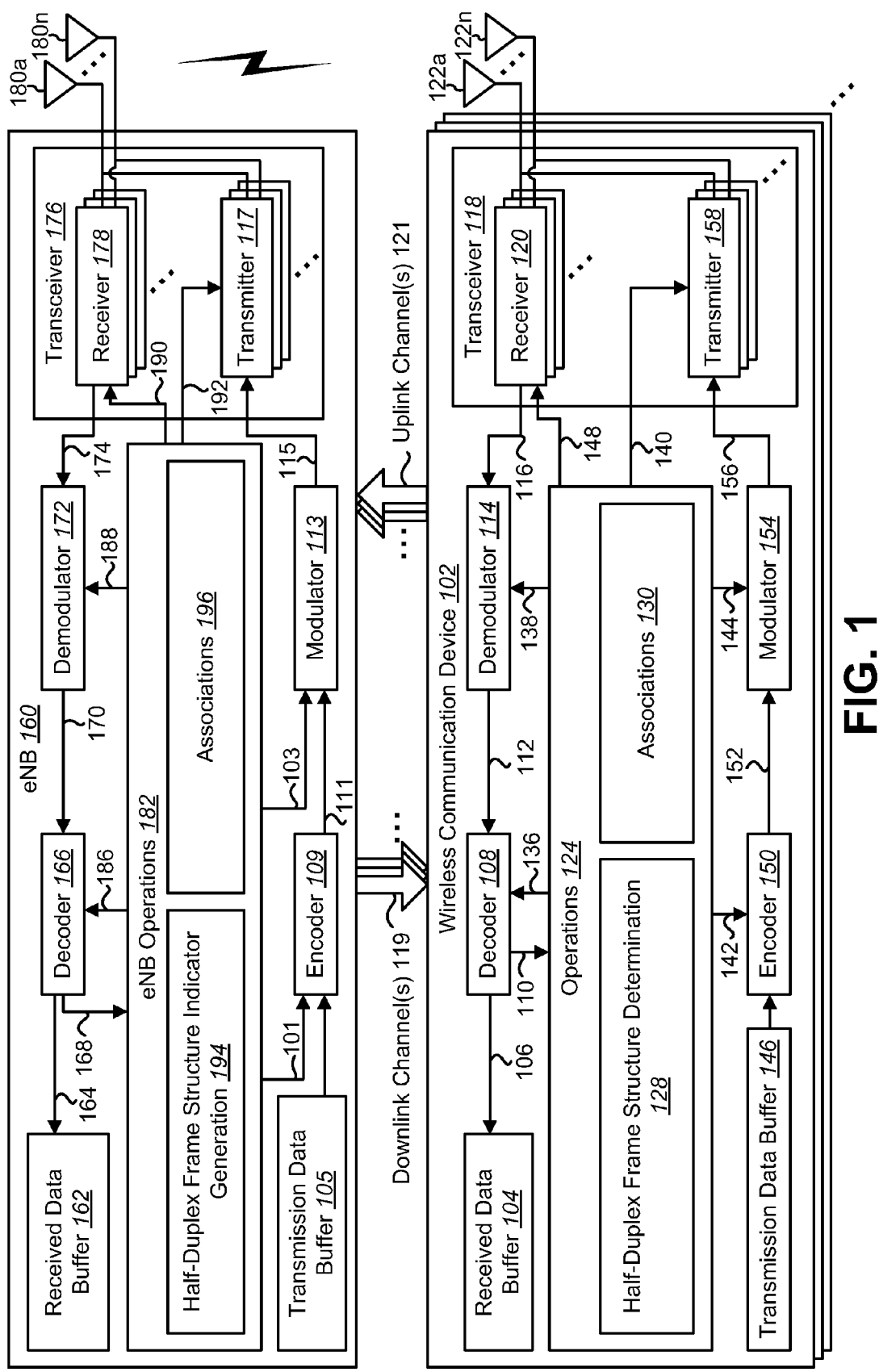
FIG. 1 is a block diagram illustrating one configuration of an evolved node B (eNB) and one or more wireless communication devices in which systems and methods for enabling half-duplex communication may be implemented.

A wireless communication device for enabling half-duplex communication is described. The wireless communication device includes a processor and instructions stored in memory that is in electronic communication with the processor. The wireless communication device receives an indicator. The wireless communication device also determines a half-duplex frame structure with a regular uplink (UL) and downlink (DL) switching pattern based on the indicator. The half-duplex frame structure includes at least one UL subframe group including one or multiple consecutive UL subframes and at least one DL subframe group including one or multiple consecutive DL subframes. The wireless communication device further receives DL information in at least one of the DL subframes. The wireless communication device additionally sends UL information in at least one of the UL subframes. The wireless communication device may be a Machine-Type Communication (MTC) device. The indicator may be received via at least one of Radio Resource Control (RRC) signaling, a broadcast signal and a synchronization signal. A half-duplex frame structure periodicity may be the same as a radio frame periodicity.

The wireless communication device may monitor a restricted DL subframe set including fewer than all DL subframes in the at least one DL subframe group. The wireless communication device may apply different association timings to form a guard period.

The at least one UL subframe group may include four UL subframes and the at least one DL subframe group may include four DL subframes. The at least one UL subframe group may be switched with the at least one DL subframe group.

The wireless communication device may determine an offset. The wireless communication device may also apply the offset to a Physical Downlink Shared Channel (PDSCH) Hybrid Automatic Repeat Request Acknowledgement (HARQ-ACK) association, to a Physical Uplink Shared Channel (PUSCH) scheduling association and to a PUSCH HARQ-ACK association.

The UL subframe group may include a different number of subframes than the DL subframe group. The wireless communication device may apply a group association mapping.

The at least one UL subframe group may correspond to a first carrier and the at least one DL subframe group may correspond to a second carrier that is separate from the first carrier. At least one of Time-Division Duplexing (TDD) uplink-downlink (UL-DL) configurations 0-6 with one or more corresponding associations may be applied for half-duplex operations.

The half-duplex frame structure may include at least one convertible subframe based on a range of Time-Division Duplexing (TDD) uplink-downlink (UL-DL) configurations. The wireless communication device may apply a Physical Downlink Shared Channel (PDSCH) Hybrid Automatic Repeat Request Acknowledgement (HARQ-ACK) association corresponding to a first TDD UL-DL configuration. The wireless communication device may also apply a Physical Uplink Shared Channel (PUSCH) scheduling association and a PUSCH HARQ-ACK association corresponding to a second TDD UL-DL configuration.

An evolved Node B (eNB) for enabling half-duplex communication is also described. The eNB includes a processor and instructions stored in memory that is in electronic communication with the processor. The eNB determines an indicator that indicates a half-duplex frame structure with a regular uplink (UL) and downlink (DL) switching pattern. The half-duplex frame structure includes at least one UL subframe group including one or multiple consecutive UL subframes and at least one DL subframe group including one or multiple consecutive DL subframes. The eNB also sends the indicator. The eNB further receives UL information in at least one of the UL subframes. The eNB additionally sends DL information in at least one of the DL subframes. The eNB may send one or more offsets. A half-duplex frame structure periodicity may be the same as a radio frame periodicity.

The at least one UL subframe group may include four UL subframes and the at least one DL subframe group may include four DL subframes. The at least one UL subframe group may be switched with the at least one DL subframe group.

The UL subframe group may include a different number of subframes than the DL subframe group. The eNB may also apply a group association mapping.

The at least one UL subframe group may correspond to a first carrier and the at least one DL subframe group may correspond to a second carrier that is separate from the first carrier. At least one of Time-Division Duplexing (TDD) uplink-downlink (UL-DL) configurations 0-6 with one or more corresponding associations may be applied for half-duplex operations.

The half-duplex frame structure may include at least one convertible subframe based on a range of Time-Division Duplexing (TDD) uplink-downlink (UL-DL) configurations. The eNB may apply a Physical Downlink Shared Channel (PDSCH) Hybrid Automatic Repeat Request Acknowledgement (HARQ-ACK) association corresponding to a first TDD UL-DL configuration. The eNB may also apply a Physical Uplink Shared Channel (PUSCH) scheduling association and a PUSCH HARQ-ACK association corresponding to a second TDD UL-DL configuration.

A method for enabling half-duplex communication on a wireless communication device is also described. The method includes receiving an indicator. The method also includes determining a half-duplex frame structure with a regular uplink (UL) and downlink (DL) switching pattern based on the indicator. The half-duplex frame structure includes at least one UL subframe group including one or multiple consecutive UL subframes and at least one DL subframe group including one or multiple consecutive DL subframes. The method further includes receiving DL information in at least one of the DL subframes. The method additionally includes sending UL information in at least one of the UL subframes.

A method for enabling half-duplex communication on an evolved Node B (eNB) is also described. The method includes determining an indicator that indicates a half-duplex frame structure with a regular uplink (UL) and downlink (DL) switching pattern. The half-duplex frame structure includes at least one UL subframe group including one or multiple consecutive UL subframes and at least one DL subframe group including one or multiple consecutive DL subframes. The method also includes sending the indicator. The method further includes receiving UL information in at least one of the UL subframes. The method additionally includes sending DL information in at least one of the DL subframes.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, a Machine-Type Communication (MTC) device, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." It should be noted that one example of a UE or wireless communication device may be an MTC device. It should be noted, however, that examples of a "regular" or "typical" UE may include devices such as cellular phones, smart phones, laptop computers, etc.

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Telecommunications-Advanced (IMT-Advanced) and all of it or a subset of it may be adopted by 3GPP as licensed bands (e.g., frequency band) to be used for communication. A "cell" may have temporal, spatial (e.g., geographical) and frequency characteristics.

The systems and methods disclosed herein described devices for enabling half-duplex communication. For example, UL-DL configurations for half-duplex MTC devices are described. For instance, UL-DL configurations for half-duplex low-cost MTC devices in FDD-LTE are described.

In 3GPP Release-11, the provisioning of low-cost MTC device communications based on LTE is under study. The Radio Access Network Radio Layer 1 (RAN1) identifies aspects of cost reduction are identified for MTC devices and evaluates specification changes required to support it. Major areas of cost reduction may include reduction of bandwidth, reduction of peak rate, reduction of the number of Radio Frequency (RF) chains and half-duplex operations, etc. For example, MTC device cost reduction may be classified in RF components and processing. Half-duplex operation may be a one aspect of RF cost reduction as well as processing optimization.

The systems and methods disclosed herein may provide different procedures to support half-duplex operation in FDD-LTE networks for an MTC device in addition to corresponding specification changes. The procedures provided in this disclosure may reduce device cost by reducing required subframe monitoring and by additionally or alternatively limiting and improving (e.g., optimizing) a Hybrid Automatic Repeat Request (HARQ) procedure, etc.

Half-duplex operation of an FDD-LTE MTC device may lead to 4-7% in overall cost savings. Additional benefits may be achieved by improving (e.g., optimizing) the uplink and downlink timing and HARQ procedure. The systems and methods disclosed herein may provide one or more procedures as follow. A regular UL and DL switching pattern may be applied to simplify half-duplex operation while maintaining the same FDD association timings. An offset may be applied to standard FDD association timings to better align DL-UL pairing. A TDD UL-DL configuration may be applied to FDD communications. This may be done such that an MTC device may work with half duplex in separate DL and UL bands and may reuse the TDD timing. The systems and methods disclosed herein may reduce the DL monitoring set of an MTC device. Additionally or alternatively, the number of HARQ Acknowledgement (HARQ-ACK) processes supported by each MTC device may be reduced.

In Radio Access Network (RAN) plenary 53, a Study Item (SI) was approved on the provision of low-cost MTC UEs based on LTE to be competitive with that of GSM/GPRS terminals targeting the same low-end MTC market. In the past several RAN1 meetings, cost drivers of a reference LTE modem and cost reduction estimation have been discussed for individual techniques.

Major contributors to cost reduction may include one or more of the reduction of maximum bandwidth, a single receive Radio Frequency (RF) chain, reduction of peak rate, reduction of transmit power and half-duplex operation. The reduction of maximum bandwidth, especially if the MTC operates in a subband within an existing band, may lead to new designs for control signaling (e.g., Physical Downlink Control Channel (PDCCH), Physical Uplink Control Channel (PUCCH), etc.). A reduced RF chain, peak rate and transmit power may reduce the MTC cost on RF and baseband, but may have an impact on cell coverage.

Half-duplex operation may be one significant aspect impacting cost reduction. Half-duplex operation may not impact cell coverage and performance. A good half-duplex design may simplify operation and may provide reduced power consumption in addition to baseband and RF cost reduction.

Allowing half-duplex operation for FDD-LTE communications may have one or more benefits, which are given as follows. There may be no need for a duplexer filter, thus reducing RF cost. For example, this may provide 4-8% cost savings compared with a reference LTE modem. Requirements on baseband processing (e.g. buffer memory size, computing capability) may be reduced, since an MTC device may provide either transmission or reception at a time, but not both. Energy savings may be provided, since an MTC device does not need to monitor a DL subframe during UL transmission. Maximum power consumption may be comparatively lower than that of a full-duplex device.

Several approaches for half-duplex operation for an MTC device with FDD-LTE in accordance with the systems and methods disclosed herein are given as follows. Half duplex may be considered for (low-cost) MTC devices for several reasons. First, the required data rate may be much lower than a typical UE. Secondly, most of the traffic may not be delay sensitive. The lower data rate means that an MTC device may not need to receive or transmit in multiple subframes in a radio frame. Thus, the MTC device may not need to monitor all DL subframes and may have a reduced number of HARQ processes. The delay insensitivity means that known association timing may be relaxed. Furthermore, (as indicated in connection with FIGS. 4 and 5, for example), some UL-DL switching rules may need to be specified.

One or more of the following aspects may provide enhancement of half-duplex operation for MTC devices. New UL-DL switching and allocation rules may be applied. An MTC device may monitor one or more restricted DL subframes. Relaxed or extended UL and DL association timing may be applied. A reduced number of HARQ processes and modified procedures may be implemented. One or more of these aspects may be implemented independently or in combination with other aspects. In one example, only one HARQ-ACK process may be supported on an MTC device. Thus, no additional packet may be transmitted before the current one is successfully delivered, for instance.

Scheduling restrictions may be applied for each DL-to-UL switching. To reduce restrictions, the amount of DL-to-UL switching may be reduced (e.g., minimized). For example, the DL subframes and UL subframes may be grouped together to form a more regular pattern. Several approaches for UL-DL switching and allocation in accordance with the systems and methods disclosed herein are given hereafter. It should be noted that one or more these approaches (or features thereof) may be implemented independently or in combination with another of the approaches (or features thereof).

In a first approach, a periodic UL and DL switching pattern may be implemented with standard 4 millisecond (ms) timing. In the first approach (as described in connection with FIG. 6), DL and UL subframes may be aggregated into 4 ms DL subframe groups or DL subframe sets. Thus, an MTC device may switch directions (between DL and UL) in a regular switching pattern with 8 ms periodicity. This may be done instead of randomly switching based on UL scheduling. This approach maintains an 8 ms Round Trip Time (RTT) as given in 3GPP Release 8, 9 and 10. This simplifies scheduling and reduces continuous monitoring on the DL. Furthermore, this first approach preserves standard 4 ms UL-DL association timing.

With half-duplex operation in FDD networks, a guard period may be created by the MTC device by not receiving the last part of a DL subframe immediately preceding an UL subframe sent from the same MTC device. Thus, only one restriction may be utilized in this first approach. For example, there may be no Physical Downlink Shared Channel (PD-SCH) scheduled for an MTC device in the last DL subframe in a DL subframe group or DL subframe set if an UL transmission is scheduled for the MTC device in the next subframe. Thus, no UL HARQ-ACK reporting may be needed in the last UL subframe in a UL subframe group or UL subframe set. Alternatively, a PDSCH may be scheduled with a reduced number of Orthogonal Frequency-Division Multiplexing (OFDM) symbols allocated for the PDSCH for an MTC device in the last DL subframe in a DL subframe group or DL subframe set if an UL transmission is scheduled for the MTC device in the next subframe. The guard period and the number of OFDM symbols that may be allocated for the PDSCH of the given MTC may be determined (by the eNB, for example) based on the cell deployment (e.g., cell size and distance between the MTC device and the eNB). It should be noted that not scheduling a PDSCH and scheduling a PDSCH with a reduced number of OFDM symbols (compared to a typical PDSCH) may be examples of "PDSCH restrictions" or "scheduling restrictions" as used herein. It should be noted that the last DL subframe in a DL subframe group or DL subframe set may still schedule a Physical Uplink Shared Channel (PUSCH) transmission in the last UL subframe of the next UL subframe group or UL subframe set. The last subframe in a DL subframe group may thus become a virtual switching subframe. One example is described in connection with FIG. 6.

The switching pattern may be provided by higher layer signaling to an MTC device or to a group of MTC devices. The switching pattern may be synchronized for a group of MTC devices or may be maintained independently at each MTC device. In the latter case where the switching pattern is maintained independently, an MTC device may have its own timing on the switching pattern when a PDCCH targeted to the MTC device is received, for example.

With the switching pattern in the first approach (as described in connection with FIG. 6, for example), the maximum number PDSCH HARQ processes for MTC devices may be reduced to 3 if the last DL subframe is not used for PDSCH transmission for an MTC device. Furthermore, the maximum number of PDSCH HARQ processes for MTC devices may be reduced to 4 if the last DL subframe is used for a PDSCH transmission with a reduced number of OFDM symbols for an MTC device. Additionally, the maximum number of PUSCH HARQ processes may be reduced to 4. Since MTC devices have a lower data rate, further constraints may be applied. For example, each MTC device may use only one subframe in a DL subframe group and thus one subframe in the corresponding UL subframe group. In this case, the restriction on the last subframe in a DL subframe group may not apply since an UL subframe is not immediately after the DL subframe for the same MTC device. Once it is configured, the MTC device may stop monitoring other DL subframes in a DL subframe group or set.

One benefit of this approach may be backward compatibility, since the same association timing may be used as in FDD. In known half duplex in FDD-LTE, this association timing may be achieved by eNB scheduling. However, a UE or MTC device in known approaches does not know the switching patterns and needs to monitor for a downlink transmission in any subframe that is not scheduled for UL transmission. Therefore, the switching pattern and rules in accordance with the first approach may be specified for half-duplex operation of MTC devices.

In a second approach, association timings may be extended to form a larger DL subframe group or set and a larger UL subframe group or set. Because MTC traffic may not be delay sensitive, association timing may be extended. An offset may be applied to one or more (e.g., all) association timings, including PDSCH HARQ-ACK, PUSCH scheduling and PUSCH HARQ-ACK. For example, assuming that an offset of k subframes is used, the MTC UL-DL pattern may be extended to have a periodicity and RTT of 2*(4+k), with (4+k) DL subframe groups and (4+k) UL subframe groups (as described in connection with FIG. 7, for example).

The offset may be signaled via higher layer signaling (e.g., RRC signaling). Additionally or alternatively, the offset may be signaled in synchronization and/or broadcasting signals. Thus, the second approach may be an extension of the first approach, with similar benefits and constraints. In some cases, PDSCH scheduling restrictions may be applied. For example, there may be no PDSCH scheduled for an MTC device in the last DL subframe in a DL subframe group or DL subframe set if an UL transmission is scheduled for the MTC device in the next subframe. Thus, no UL HARQ-ACK reporting may be needed in the last UL subframe in a UL subframe group or UL subframe set. Alternatively, a PDSCH may be scheduled with a reduced number of OFDM symbols allocated for the PDSCH for an MTC device in the last DL subframe in a DL subframe group or DL subframe set if an UL transmission is scheduled for the MTC device in the next subframe. The guard period and the number of OFDM symbols that may be allocated for the PDSCH of the given MTC may be determined (by the eNB, for example) based on the cell deployment (e.g., cell size and distance between the MTC device and the eNB).

With extended timings for MTC devices, the MTC devices may need to be managed separately from regular UEs due to different HARQ processes and scheduling timings. If MTC devices are managed in a different group, they may be treated as a new carrier with separate (e.g., independent) timing and HARQ-ACK processes. Furthermore, MTC devices may operate in a subband of an existing carrier, which is thus a carrier type beyond those specified by 3GPP Release 8, 9 and 10 specifications. This carrier may be operated independently and have its own timing and HARQ-ACK processes.

With the switching pattern described in the second approach, the maximum PDSCH HARQ processes for MTC devices may be (4+k−1) if the last DL subframe is not used for PDSCH transmission for an MTC device. Furthermore, the maximum number of PDSCH HARQ processes for MTC devices may be (4+k) if the last DL subframe is used for PDSCH transmission with a reduced number of OFDM symbols for an MTC device. Additionally, the number of PUSCH HARQ processes may be reduced to (4+k). Further constraints may be applied. For example, each MTC device may use only one subframe in a DL subframe group, and thus one subframe in the corresponding UL subframe group. In this case, the restriction on the last subframe in a DL subframe group may not apply since an UL subframe is not immediately after the DL subframe for the same MTC device. Once it is configured, the MTC device may stop monitoring other DL subframes in a DL subframe group. One example of a half-duplex pattern with extended association timing is described in connection with FIG. 7 below.

In a third approach, different association timings may be applied to form a guard period. For example, an MTC device may not be as powerful as a regular UE. Accordingly, the MTC device may require a comparatively longer time for processing a DL reception. However, an eNB may provide feedback without a minimum delay in order to reduce the RTT. Thus, in a third approach, different offsets may be applied to different association timings.

In one case, no offset may be introduced for PUSCH HARQ-ACK feedback timing and the same offset may be applied to both PDSCH HARQ-ACK timing and PUSCH scheduling timings. For example, assuming an offset is i, with DL and UL subframe grouping, a guard period of i may be formed between the DL subframe group and UL subframe group. The MTC device may not expect any PDSCH or PUSCH scheduling in the guard period.

In another case, an offset of k may be introduced for PUSCH HARQ-ACK feedback timing, and an offset of (k+i) may be applied to the PDSCH HARQ-ACK timing and PUSCH scheduling timings. With DL and UL subframe grouping, a guard period of i may be formed between a DL subframe group and an UL subframe group. The MTC device may not expect any PDSCH or PUSCH scheduling in the guard period.

Figure 8:
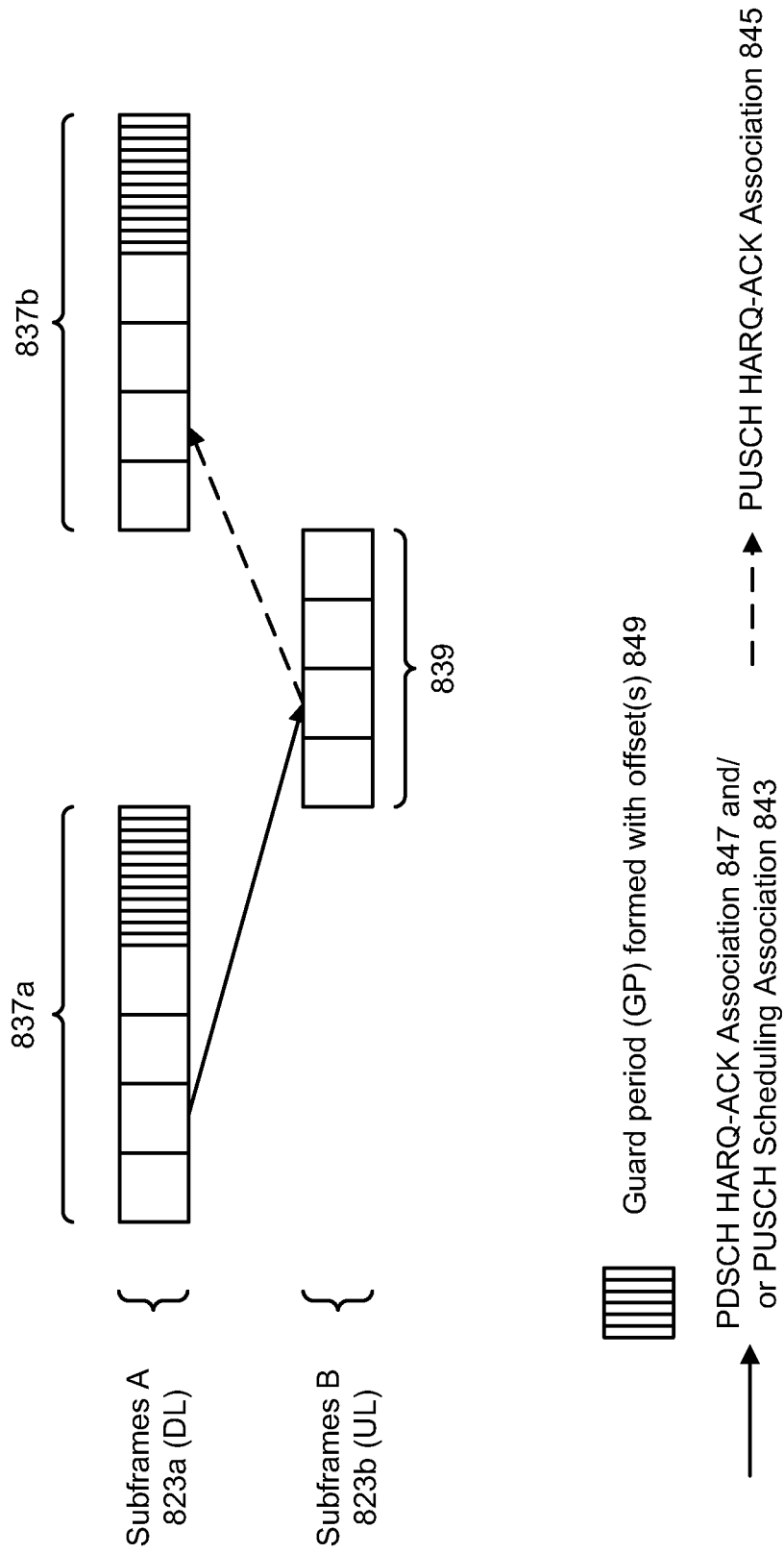
FIG. 8 is a diagram illustrating one example of a third approach in accordance with the systems and methods disclosed herein.

One example of a guard period with a timing offset is illustrated in FIG. 8. In particular, one example of the third approach with standard PUSCH HARQ-ACK feedback timing and an offset of 2 on both PDSCH HARQ-ACK and PUSCH scheduling timings is described in connection with FIG. 8. Thus, a guard period of 2 subframes may be formed for DL-to-UL switching.

In a fourth approach, group association mappings may be applied for unbalanced UL and DL communications. The foregoing approaches may or may not assume that the same number of subframes are configured for DL and UL. They may or may not also assume that the same timing and offset are used for each type of DL and UL association. For an MTC device (e.g., low-cost MTC device), an UL and DL switching pattern may be applied with different offsets in different subframes. Furthermore, group linkage may be used (e.g., one or more DL subframes may be mapped to one UL subframe and vice versa). To maintain a constant linkage, the PUSCH HARQ-ACK and PUSCH scheduling subframe may be at the same position in the UL-DL pattern. One example of group association mapping is described in connection with FIG. 9. More specifically, one example of two DL subframes mapped to one UL subframe with variable association timings is described in connection with FIG. 9 below.

In a fifth approach, association timings may be applied to sync with a radio frame structure. In the association timing of FDD-LTE in 3GPP Release 8, 9 and 10 specifications, the RRT is 8 TTIs (e.g., a minimum delay for LTE systems, for example). However, the 8 ms RTT is not synchronized with the 10 ms radio frame structure. It may be difficult to have signaling with an 8 ms periodicity pattern, since it is continuously shifting in each radio frame. Therefore, it may be beneficial to sync the RTT for an MTC device (e.g., low-cost MTC device) with a radio frame (e.g., 10 ms). Thus, a half-duplex frame structure periodicity may be the same as a radio frame periodicity in accordance with the systems and methods disclosed herein.

For example, an offset k=1 may be applied in accordance with the second approach given above. In this case, all association timings become 5 ms instead of 4 ms, for instance. In another example, an offset of 2 may be applied to PDSCH HARQ-ACK and PUSCH scheduling only (as described in connection with FIG. 8, for example).

In a sixth approach, TDD configurations may be applied to an FDD-LTE network. TDD-LTE utilizes a half-duplex structure inherently, and may have different UL-DL configurations. TDD-LTE has periodicity of either 5 ms or 10 ms. Thus, it is synchronized with the radio frame structure. Thus, applying TDD configurations on FDD-LTE is another option to support half-duplex communications on FDD-LTE.

TDD-LTE operates on the same carrier for UL and DL. With FDD, DL and UL are on different carriers. However, the same association timing of a TDD configuration may be applied to MTC devices in FDD networks. There may be no scheduling conflicts if MTC devices follow the TDD timing. One example of applying a TDD UL-DL configuration on FDD-LTE is described in connection with FIG. 10 below. More specifically, one example of applying TDD UL-DL configuration 1 to FDD-LTE is described in connection with FIG. 10 below. It should be noted, however, that there may be no special subframes as in standard TDD configurations. However, there may be restrictions in the last DL subframe in a DL subframe group, e.g., a guard period may be created by the MTC device by not receiving the last part of a DL subframe that immediately precedes an UL subframe from the same MTC device. In other words, the last DL subframe in a DL subframe group may serve as a virtual special subframe with a reduced PDSCH allocation and a guard period. In some cases, PDSCH scheduling restrictions may be applied. For example, there may be no PDSCH scheduled for an MTC device in the last DL subframe in a DL subframe group or DL subframe set if an UL transmission is scheduled for the MTC device in the next subframe. Thus, no UL HARQ-ACK reporting may be needed for the corresponding PDSCH. Alternatively, a PDSCH may be scheduled with a reduced number of OFDM symbols allocated for the PDSCH for an MTC device in the last DL subframe in a DL subframe group or DL subframe set if an UL transmission is scheduled for the MTC device in the next subframe. The guard period and the number of OFDM symbols that may be allocated for the PDSCH of the given MTC device may be determined (by the eNB, for example) based on the cell deployment (e.g., cell size and distance between the MTC device and the eNB).

For the same DL or UL subframe, the timings on a TDD configuration may be (e.g., is likely to be) different from the FDD timing. This may cause problems. However, if MTC devices are managed in a different group, they may be treated as a separate carrier with separate timing and HARQ-ACK processes. Furthermore, MTC devices may operate in a sub-band of an existing carrier, which is thus a carrier type beyond those given by 3GPP Release 8, 9 and 10 specifications. This carrier may be operated independently and have separate timing and HARQ-ACK processes.

Different types of MTC devices may have different traffic characteristics, and may require different UL-DL configurations. The same TDD UL-DL configuration may be applied for all MTC devices. Alternatively, different TDD UL-DL configurations may be applied to different MTC devices. If multiple TDD UL-DL configurations are applied, an MTC device may follow its own configured TDD UL-DL configuration. If multiple TDD UL-DL configurations are applied to different MTC devices, the HARQ-ACK processes of different TDD configurations may be maintained separately. Thus, each TDD UL-DL configuration may be considered to be an independent carrier or new carrier type.

If a TDD UL-DL configuration is applied to an MTC device or a group of MTC devices, the actual UL-DL configuration may be indicated to the device by one or more of higher layer signaling (e.g., RRC signaling), through synchronization and broadcasting channels, etc. If multiple TDD UL-DL configurations are used for MTC devices, the actual UL-DL configurations may be indicated to the device by one or more of higher layer signaling (e.g., RRC signaling), through synchronization and broadcasting channels, etc.

Alternatively, instead of configuring different TDD UL-DL configurations for different types of MTC devices, the eNB may allow flexible and dynamic UL-DL configurations of MTC devices. In this case, the HARQ-ACK processes of MTC devices in the same cell may be managed together as one carrier or as a new carrier. This may be achieved by applying separate reference configurations on PDSCH and PUSCH timing.

For example, the eNB may indicate (e.g., signal) a first reference TDD UL-DL configuration for PDSCH HARQ-ACK timing and indicate (e.g., signal) a second reference TDD UL-DL configuration for PUSCH scheduling and PUSCH HARQ-ACK timing. The set of UL subframes in the first reference configuration may be a subset of the set of UL subframes in the second reference configuration. Furthermore, the set of DL subframes in the second reference configuration may be a subset of the set of DL subframes in the first reference configuration. With separate timings for PDSCH and PUSCH, the eNB may dynamically select the directions in some subframes for MTC devices without any conflict and any timing changes.

If a first TDD UL-DL configuration and a second TDD UL-DL configuration are used for MTC devices, the first and the second UL-DL configurations may be indicated to the devices by one or more of higher layer signaling (e.g., RRC signaling), through synchronization and broadcasting channels etc.

In one example (as described in connection with FIG. 11, for instance), the eNB provide a maximum uplink allocation of 40% and a maximum downlink allocation of 80% due to MTC traffic characteristics. In this example, the eNB may set TDD UL-DL Configuration 4 with 2 UL subframes and a 10 ms periodicity as the first reference configuration for PDSCH HARQ-ACK reporting, so that all PDSCH HARQ-ACK may be reported in subframes 2 and 3 in the uplink carrier. On the other hand, the eNB may set TDD UL-DL configuration 1 with 2 UL subframes in a 5 ms periodicity as the second reference configuration, allowing PUSCH scheduling in up to 4 UL subframes in every 10 ms. With half-duplex operation in an FDD network, a guard period may be created by the MTC device, by not receiving the last part of a DL subframe immediately preceding an UL subframe from the same MTC device. Convertible subframes may be subframes that can be dynamically allocated by the eNB to either DL or UL, depending on association timing. This provides flexibility for resource allocation without complicated signaling. It should be noted that if a convertible subframe is converted from DL to UL, and the convertible subframe is immediately after a subframe that is allocated for DL transmission, a guard period may be created by the MTC device by not receiving the last part of a DL subframe immediately preceding the converted UL subframe from the same MTC device.

Moreover, with a given TDD UL-DL configuration, an MTC device may be signaled to monitor only a subset of the subframes. This may reduce the number of HARQ-ACK processes in an MTC device and may provide more power savings. In one example (e.g., setting), only one HARQ-ACK process may be supported on an MTC device.

If the reference TDD UL-DL configurations are applied to an MTC device or to a group of MTC devices, the reference UL-DL configurations may be provided to the MTC devices by one or more of higher layer signaling (e.g., RRC signaling), through synchronization and broadcasting channels, etc.

The eNB may further restrict the subframes used for MTC devices. Thus, only a subset of the subframes may be utilized in a TDD UL-DL configuration. An MTC device may have a reduced number of HARQ processes. For example, an MTC device may have a single HARQ process such that an additional packet cannot be transmitted until the HARQ process of the current packet is finished.

For a HARQ-ACK process, it may be beneficial to maintain the same subframe location in a radio frame. Thus, the TDD UL-DL configurations with 10 ms RTT may be utilized for configurations with 5 ms periodicity. On the other hand, since MTC device traffic may not be delay sensitive, configurations with 10 ms periodicity may be utilized. With TDD configurations with 10 ms periodicity, the amount of DL-UL switching may be reduced (e.g., minimized).

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of an eNB 160 and one or more wireless communication devices 102 in which systems and methods for enabling half-duplex communication may be implemented. One example of the wireless communication device 102 is a MTC device. The one or more wireless communication devices 102 communicate with the eNB 160 using one or more antennas 122*a-n*. For example, a wireless communication device 102 transmits electromagnetic signals to the eNB 160 and receives electromagnetic signals from the eNB 160 using the one or more antennas 122*a-n*. The eNB 160 communicates with the wireless communication device 102 using one or more antennas 180*a-n*.

The wireless communication device 102 and the eNB 160 may use one or more channels 119, 121 to communicate with each other. For example, a wireless communication device 102 may transmit information or data to the eNB 160 using one or more uplink channels 121. Examples of uplink channels 121 include a PUCCH and a Physical Uplink Shared Channel (PUSCH), etc. The eNB 160 may also transmit information or data to the one or more wireless communication devices 102 using one or more downlink channels 119, for instance. Examples of downlink channels 119 include a PDCCH, a PDSCH, etc. Other kinds of channels may be used.

Each of the one or more wireless communication devices 102 may include one or more transceivers 118, one or more demodulators 114, one or more decoders 108, one or more encoders 150, one or more modulators 154, a received data buffer 104, a transmission data buffer 146 and an operations module 124. For example, one or more reception and/or transmission paths may be implemented in the wireless communication device 102. For convenience, only a single transceiver 118, decoder 108, demodulator 114, encoder 150 and modulator 154 are illustrated in the wireless communication device 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The wireless communication device 102 may use the decoder 108 to decode signals. The decoder 108 may produce one or more decoded signals 106, 110. For example, a first decoded signal 106 may comprise received payload data, which may be stored in the received data buffer 104. A second decoded signal 110 may comprise overhead data and/or control data. For example, the second decoded signal 110 may provide data that may be used by the operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the operations module 124 may be implemented in hardware, software or a combination of both.

In general, the operations module 124 may enable the wireless communication device 102 to communicate with the eNB 160. The operations module 124 may include a half-duplex frame structure determination module 128 and associations 130.

The half-duplex frame structure determination module 128 may determine a half-duplex frame structure for communicating with the eNB 160. For example, a frame structure may specify a number of UL subframes and DL subframes in which communications may occur. For instance, the wireless communication device 102 may send UL information in one or more UL subframes and may receive DL information in one or more DL subframes. Furthermore, the eNB 160 may send DL information in one or more DL subframes and may receive UL information in one or more UL subframes. In some cases, the wireless communication device 102 may determine a half-duplex frame structure with a periodicity that is the same as that of a radio frame. For example, a half-duplex frame structure periodicity may be the same as a typical radio frame periodicity of 10 ms.

In some implementations, the half-duplex frame structure may be applied to different carriers. For example, an UL subframe group may correspond to a first carrier and a DL subframe group may correspond to a second carrier that is separate from the first carrier. For instance, a TDD-LTE configuration may be applied to FDD-LTE carriers. More detail is given below.

In accordance with the systems and methods disclosed herein, the wireless communication device 102 may receive an indicator (from the eNB 160, for example) and may determine a half-duplex frame structure based on the indicator. The indicator may be received via one or more of RRC signaling, a broadcast signal and a synchronization signal. In some implementations, the indicator may indicate a selection of a particular half-duplex frame structure from a set of half-duplex frame structures stored on the wireless communication device 102. Additionally or alternatively, the indicator may indicate one or more parameters for determining a half-duplex frame structure, such as a number of UL subframes, a number of DL subframes and the location(s) of subframes (e.g., start time, first subframe in a group, etc.). Additionally or alternatively, the indicator may provide one or more of offsets. In some implementations, one or more of the offsets may be indicated (e.g., sent) separately from the indicator.

The associations 130 may include one or more kinds of subframe or timing associations. Examples of associations 130 include a PDSCH HARQ-ACK association, a PUSCH HARQ-ACK association and a PUSCH scheduling association. A PDSCH HARQ-ACK association may indicate an UL subframe in which the wireless communication device 102 may send PDSCH HARQ-ACK based on a DL subframe that includes the PDSCH. A PUSCH scheduling association may indicate an UL subframe in which the wireless communication device 102 may send UL information (in a PUSCH) based on a DL subframe that includes a PDSCH for scheduling the PUSCH. A PUSCH HARQ-ACK association may indicate a DL subframe in which the wireless communication device 102 may receive PUSCH HARQ-ACK based on an UL subframe that includes the PUSCH (in which the PUSCH is sent, for instance). In some cases, the wireless communication device 102 may apply a group association mapping. A group association mapping is where two or more subframes in one direction may be associated with a single subframe of the other direction. For example, two different DL subframes may be associated with a single UL subframe. Additionally or alternatively, two different UL subframes may be associated with a single DL subframe. More detail is given below.

In some implementations, the wireless communication device 102 may adjust one or more of the associations 130. For example, the wireless communication device 102 may apply one or more offsets that extend one or more of the associations 130. One or more of the offsets may be received from the eNB 160. In some cases, the wireless communication device 102 may apply different association timings (based on different offsets, for example) to form a guard period. More detail is given below.

In accordance with the systems and methods disclosed herein, the half-duplex frame structure determined by the wireless communication device 102 may have a regular UL and DL switching pattern. "UL and DL switching" refers to a point in time where adjacent subframes in the half-duplex frame structure have different directions. For example, UL and DL switching may occur when an UL subframe is followed by a DL subframe or when a DL subframe is followed by an UL subframe. As used herein, a "regular" switching pattern may mean that a particular pattern may recur in the half-duplex frame structure. For example, assume that a half-duplex frame structure includes eight subframes, of which five are DL subframes followed by three UL subframes. In this example, DL-to-UL switching recurs between each fifth subframe and sixth subframe and UL-to-DL switching recurs between each eighth subframe and first subframe (of a subsequent group of subframes).

A half-duplex frame structure may include at least one UL subframe group that includes one UL subframe or multiple consecutive UL subframes. Additionally, the half-duplex frame structure may include at least one DL subframe group that includes one DL subframe or multiple consecutive DL subframes. An UL subframe group and a DL subframe group may or may not include the same number of subframes (e.g., an UL subframe group may have a different number of subframes than a DL subframe group in some cases).

In some cases, the wireless communication device 102 may not monitor all of the subframes in a DL subframe group. For example, the wireless communication device 102 may be assigned to a particular DL subframe or set of subframes that does not include all of the DL subframes in the DL subframe set. This may be indicated by the indicator described above or may be signaled separately by the eNB 160. Thus, the wireless communication device 102 may monitor a restricted DL subframe set.

The operations module 124 may provide information 148 to the one or more receivers 120. For example, the operations module 124 may inform the receiver(s) 120 when or when not to receive transmissions based on the half-duplex structure determined.

The operations module 124 may provide information 138 to the demodulator 114. For example, the operations module 124 may inform the demodulator 114 of a modulation pattern anticipated for transmissions from the eNB 160.

The operations module 124 may provide information 136 to the decoder 108. For example, the operations module 124 may inform the decoder 108 of an anticipated encoding for transmissions from the eNB 160.

The operations module 124 may provide information 142 to the encoder 150. The information 142 may include data to be encoded and/or instructions for encoding. For example, the operations module 124 may instruct the encoder 150 to encode transmission data stored in the transmission data buffer 146 and/or control information 142.

The encoder 150 may encode transmission data provided by the transmission data buffer 146 and/or other information 142 provided by the operations module 124. For example, encoding the transmission data and/or other information 142 may involve error detection and/or correction coding, mapping data to space, time and/or frequency resources for transmission, multiplexing, etc. The encoder 150 may provide encoded data 152 to the modulator 154.

The operations module 124 may provide information 144 to the modulator 154. For example, the operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The operations module 124 may provide information 140 to the one or more transmitters 158. This information 140 may include instructions for the one or more transmitters 158. For example, the operations module 124 may instruct the one or more transmitters 158 when to transmit a signal to the eNB 160. In some configurations, this may be based on the half-duplex frame structure determined. For instance, the one or more transmitters 158 may transmit during an UL subframe. The one or more transmitters 158 may upconvert and transmit the modulated signal(s) 156 to eNB 160.

The eNB 160 may include one or more transceivers 176, one or more demodulators 172, one or more decoders 166, one or more encoders 109, one or more modulators 113, a received data buffer 162, a transmission data buffer 105 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the wireless communication device 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the wireless communication device 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in the received data buffer 162. A second eNB-decoded signal 168 may comprise overhead data and/or control data. For example, the second eNB-decoded signal 168 may provide data that may be used by the eNB operations module 182 to perform one or more operations.

In general, the eNB operations module 182 may enable the eNB 160 to communicate with the one or more wireless communication devices 102. The eNB operations module 182 may include a half-duplex frame structure indicator generation module 194 and associations 196.

The half-duplex frame structure indicator generation module 194 may generate an indicator for transmission to the wireless communication device 102. The indicator may indicate a particular half-duplex frame structure. The indicator may be sent via one or more of RRC signaling, a broadcast signal and a synchronization signal. In some implementations, the indicator may indicate a selection of a particular half-duplex frame structure from a set of half-duplex frame structures stored on the wireless communication device 102. Additionally or alternatively, the indicator may indicate one or more parameters for determining a half-duplex frame structure, such as a number of UL subframes, a number of DL subframes and the location(s) of subframes (e.g., start time, first subframe in a group, etc.). Additionally or alternatively, the indicator may provide one or more offsets. In some implementations, one or more of the offsets may be indicated (e.g., sent) separately from the indicator. In accordance with the systems and methods disclosed herein, the half-duplex frame structure indicated by the indicator may have a regular UL and DL switching pattern.

In some implementations, the half-duplex frame structure may be applied to different carriers. For example, an UL subframe group may correspond to a first carrier and a DL subframe group may correspond to a second carrier that is separate from the first carrier. For instance, a TDD-LTE configuration may be applied to FDD-LTE carriers. More detail is given below.

The associations 196 may include one or more kinds of subframe or timing associations. Examples of associations 196 include a PDSCH HARQ-ACK association, a PUSCH HARQ-ACK association and a PUSCH scheduling association. A PDSCH HARQ-ACK association may indicate an UL subframe in which the eNB 160 may receive PDSCH HARQ-ACK based on a DL subframe that includes the PDSCH. A PUSCH scheduling association may indicate an UL subframe in which the eNB 160 may receive UL information (in a PUSCH) based on a DL subframe that includes a PDSCH for scheduling the PUSCH. A PUSCH HARQ-ACK association may indicate a DL subframe in which the eNB 160 may send PUSCH HARQ-ACK based on an UL subframe that includes the PUSCH (in which the PUSCH is sent, for instance). In some cases, a group association mapping may be utilized by the eNB 160. A group association mapping is where two or more subframes in one direction may be associated with a single subframe of the other direction. For example, two different DL subframes may be associated with a single UL subframe. Additionally or alternatively, two different UL subframes may be associated with a single DL subframe. More detail is given below.

In some implementations, the eNB 160 may send one or more offsets that extend one or more of the associations 196. More detail is given below.

In some cases, the eNB 160 may assigned a wireless communication device 102 to a particular DL subframe or set of subframes that does not include all of the DL subframes in the DL subframe set. This may be indicated by the indicator described above or may be signaled separately by the eNB 160.

The eNB operations module 182 may provide information 190 to the one or more receivers 178. For example, the eNB operations module 182 may inform the receiver(s) 178 when or when not to receive transmissions based on a half-duplex frame structure.

The eNB operations module 182 may provide information 188 to the demodulator 172. For example, the eNB operations module 182 may inform the demodulator 172 of a modulation pattern anticipated for transmissions from the one or more wireless communication devices 102.

The eNB operations module 182 may provide information 186 to the decoder 166. For example, the eNB operations module 182 may inform the decoder 166 of an anticipated encoding for transmissions from the one or more wireless communication devices 102.

The eNB operations module 182 may provide information 101 to the encoder 109. The information 101 may include data to be encoded and/or instructions for encoding. For example, the eNB operations module 182 may instruct the encoder 109 to encode transmission data stored in the transmission data buffer 105 and/or control information 101.

The encoder 109 may encode transmission data provided by the transmission data buffer 105 and/or other information 101 provided by the eNB operations module 182. For example, encoding the transmission data and/or other information 101 may involve error detection and/or correction coding, mapping data to space, time and/or frequency resources for transmission, multiplexing, etc. The encoder 109 may provide encoded data 111 to the modulator 113. The transmission data may include network data to be relayed to the wireless communication device 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the one or more wireless communication devices 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the one or more wireless communication devices 102. In some implementations, this may be based on the half-duplex frame structure. The one or more transmitters 117 may upconvert and transmit the modulated signal(s) 115 to one or more wireless communication devices 102.

It should be noted that a DL subframe may be transmitted from the eNB 160 to one or more wireless communication devices 102 and that an UL subframe may be transmitted from one or more wireless communication devices 102 to the eNB 160.

It should be noted that one or more of the elements or parts thereof included in the one or more eNBs 160 and one or more wireless communication devices 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
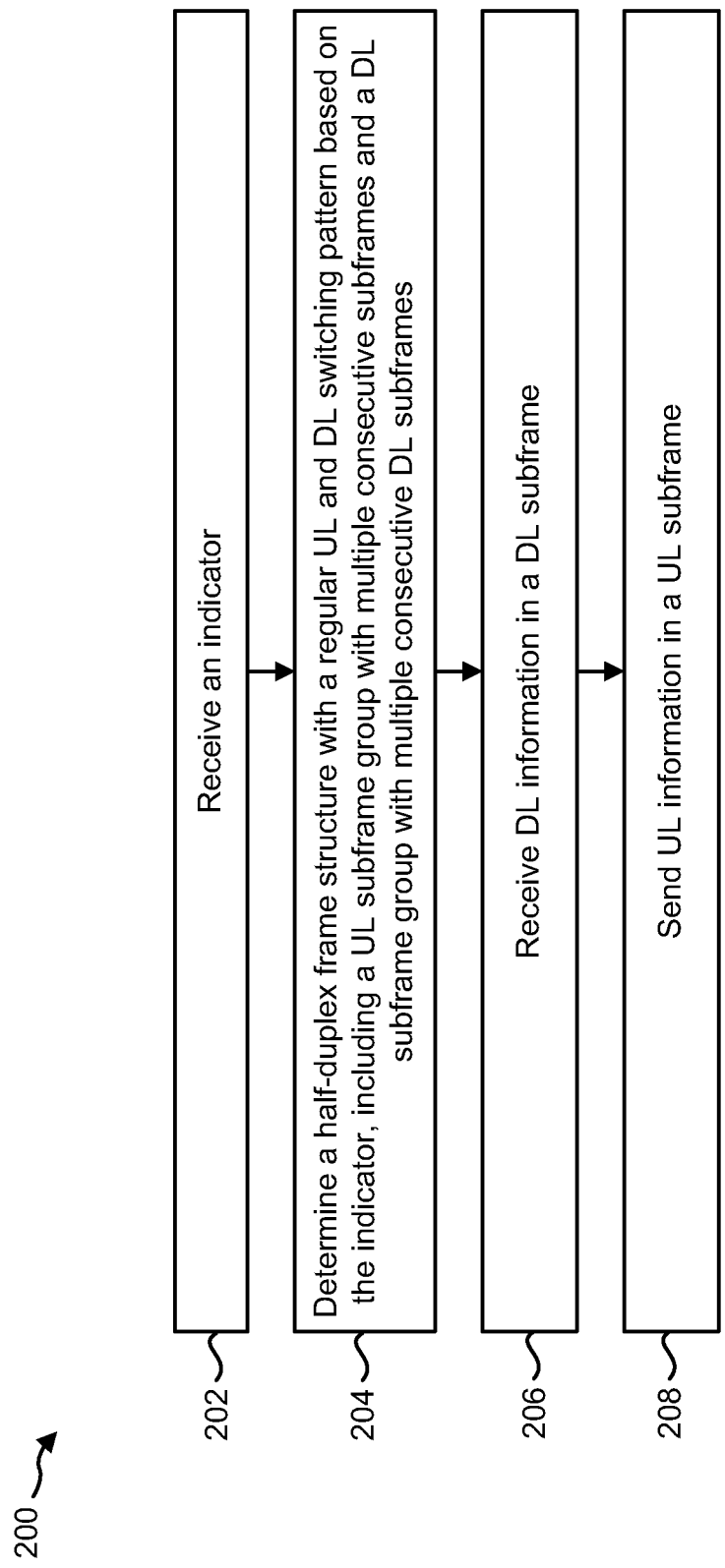
FIG. 2 is a flow diagram illustrating one configuration of a method for enabling half-duplex communication on a wireless communication device.

FIG. 2 is a flow diagram illustrating one configuration of a method 200 for enabling half-duplex communication on a wireless communication device 102. A wireless communication device 102 may receive 202 an indicator.

The wireless communication device 102 may determine 204 a half-duplex frame structure with a regular UL and DL switching pattern based on the indicator. The half-duplex frame structure includes at least one UL subframe group with multiple consecutive subframes and at least one DL subframe group with multiple consecutive DL subframes.

The wireless communication device 102 may receive 206 DL information in at least one of the DL subframes. For example, the wireless communication device 102 may receive 206 DL information sent from the eNB 160 in a DL subframe.

The wireless communication device 102 may send 208 UL information in at least one of the UL subframes. For example, the wireless communication device 102 may send 208 UL information to the eNB 160 in an UL subframe.

In some implementations, the method 200 may operate in accordance with one or more of the approaches described above and/or below. For example, the method 200 may include additional steps, procedures or functions described above and/or below. Additionally or alternatively, one or more of the method 200 steps described may be performed in accordance with the details described in connection with one or more of the approaches described above and/or below.

Figure 3:
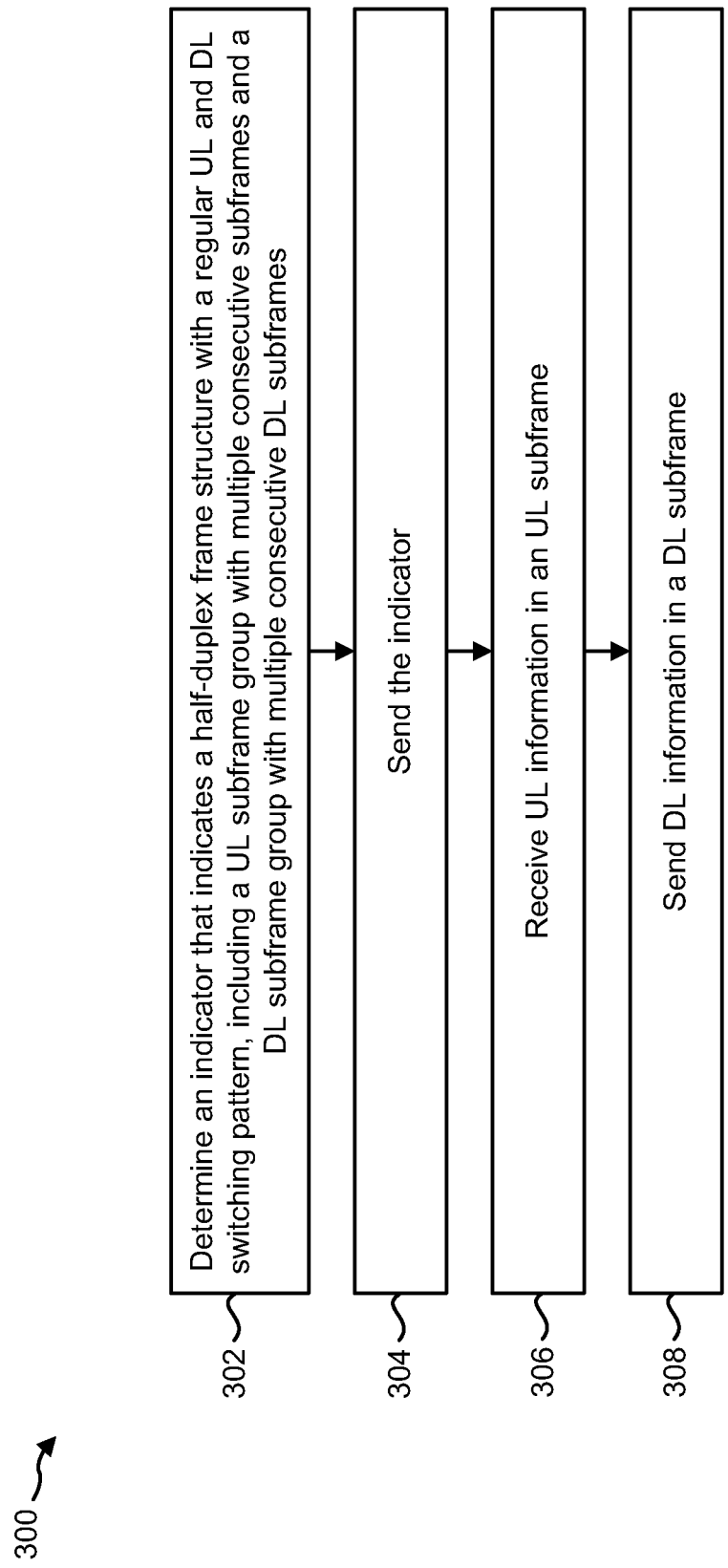
FIG. 3 is a flow diagram illustrating one configuration of a method for enabling half-duplex communication on an eNB.

FIG. 3 is a flow diagram illustrating one configuration of a method 300 for enabling half-duplex communication on an eNB 160. The eNB 160 may determine 302 an indicator that indicates a half-duplex frame structure with a regular UL and DL switching pattern. The half-duplex frame structure includes at least one UL subframe group with multiple consecutive subframes and at least one DL subframe group with multiple consecutive DL subframes.

The eNB 160 may send 304 the indicator. For example, the eNB 160 may transmit the indicator via at least one of RRC signaling, a broadcast signal and a synchronization signal.

The eNB 160 may receive 306 UL information in at least one of the UL subframes. For example, the eNB 160 may receive 306 UL information from the wireless communication device 102 in an UL subframe.

The eNB 160 may send 308 DL information in at least one of the DL subframes. For example, the eNB 160 may send 308 DL information to the wireless communication device 102 in a DL subframe.

In some implementations, the method 300 may operate in accordance with one or more of the approaches described above and/or below. For example, the method 300 may include additional steps, procedures or functions described above and/or below. Additionally or alternatively, one or more of the method 300 steps described may be performed in accordance with the details described in connection with one or more of the approaches described above and/or below.

Figure 4:
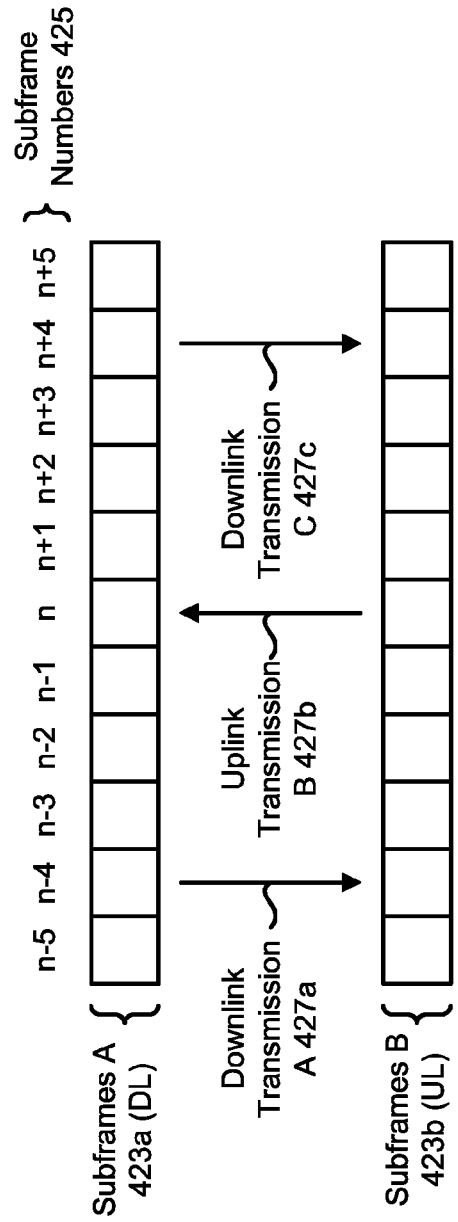
FIG. 4 is a diagram illustrating examples of uplink (UL) and downlink (DL) association timings.

FIG. 4 is a diagram illustrating examples 429 of UL and DL association timings. In particular, FIG. 4 illustrates subframes A 423*a* and subframes B 423*b* with corresponding subframe numbers 425. Downlink transmission A 427a, uplink transmission B 427b and downlink transmission C 427c are also illustrated.

Half-duplex operation in FDD-LTE is supported in 3GPP Release-8, 9 and 10 specifications. More detail regarding FDD-LTE in 3GPP Release-8, 9 and 10 specifications is given in connection with FIG. 4. In this approach, a half-duplex UE can only transmit or receive in a Transmission Time Interval (TTI). Additionally, it is assumed that the UE continuously monitors DL subframes except in subframes that are scheduled for UL transmission. Furthermore, the UE will not receive the last part of a DL subframe before an UL transmission. If the cell size is big, multiple symbols may be lost. Although supported, half-duplex communication in FDD is not mandatory and there is a significant burden on the eNB scheduler to support such a feature.

In the known approach, UL transmissions (e.g., Channel State Information (CSI) reporting, HARQ-ACK feedback of a PDSCH transmission, scheduled PUSCH transmission, etc.) may be based on a higher layer configuration. An eNB scheduler has to know the UL timings of half-duplex UEs and ensure no conflict between a half-duplex UE UL transmission and a DL transmission or scheduling. This may significantly increase eNB scheduler complexity. These restrictions also do not exist in full-duplex operations. Furthermore, a switching time is required by a half-duplex UE when the transmission direction is changed, especially from DL to UL. Thus, guard time, symbol dropping or further restrictions on scheduling may need to be specified.

FDD-LTE UL and DL association timings in accordance with the known approach are described in connection with FIG. 4. In this approach, the association timings always have a gap of 4 milliseconds (ms) (e.g., four subframes 423). In example A 429a, downlink transmission A 427a is a PDSCH transmission in subframe (n−4) and corresponding HARQ-ACK for the PDSCH is reported in subframe n as uplink transmission B 427b. In example B 429b, downlink transmission A 427a is a PDCCH in subframe (n−4) that schedules a PUSCH transmission (e.g., an UL grant). Furthermore, uplink transmission B 427b is a PUSCH transmission on subframe n and downlink transmission C 427c is the HARQ-ACK for the PUSCH that is carried on subframe (n+4).

Figure 5:
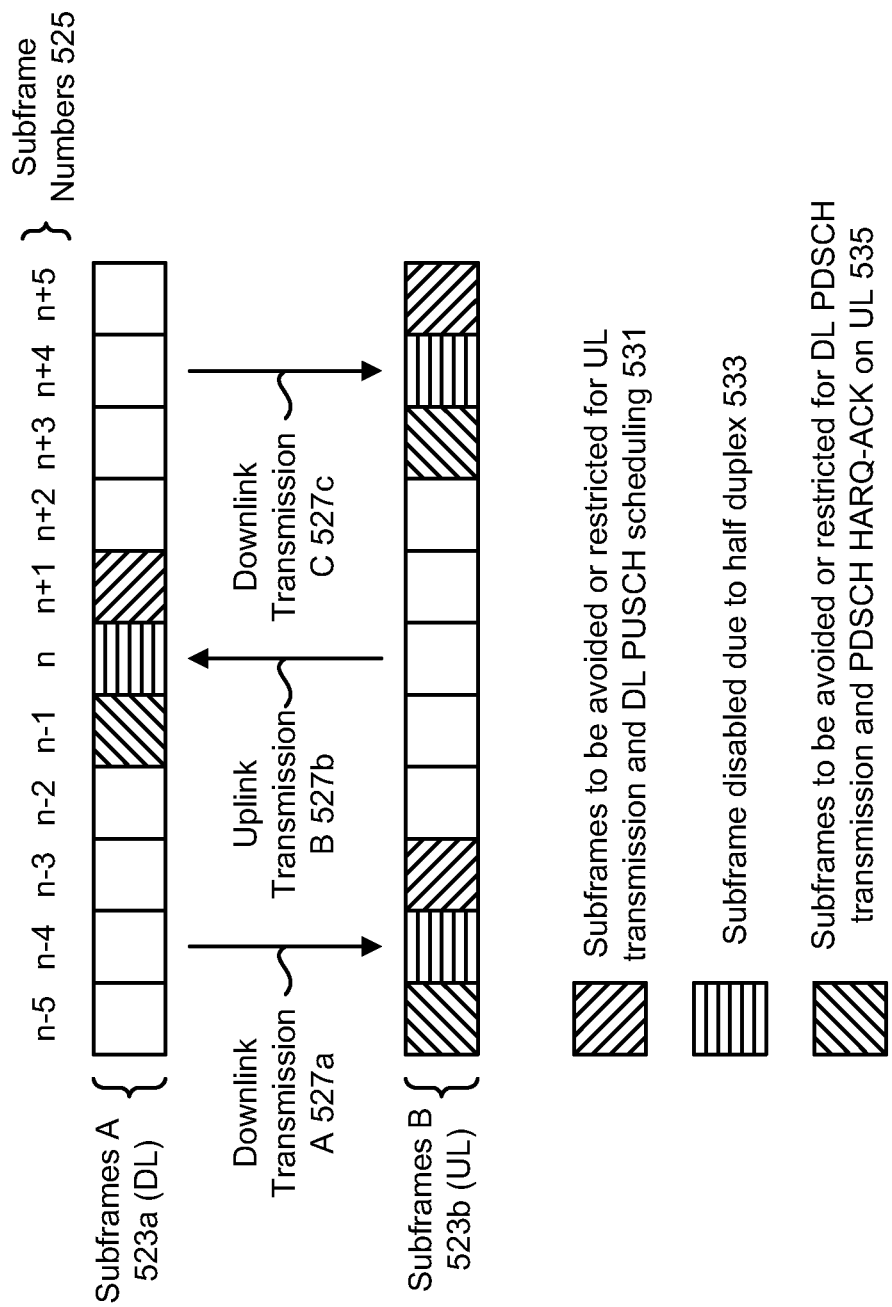
FIG. 5 is a diagram illustrating issues with a known approach.

FIG. 5 is a diagram illustrating issues with a known approach. For example, FIG. 5 illustrates impacts on subframes from half-duplex operation in FDD-LTE. In particular, FIG. 5 illustrates subframes A 523a and subframes B 523b with corresponding subframe numbers 525. Downlink transmission A 527a, uplink transmission B 527b and downlink transmission C 527c are also illustrated.

Without enhancement over the known half-duplex support in 3GPP Releases 8, 9 and 10, the usability of subframes may be negatively impacted with half duplex operation. This impact comes from the guard period requirement for DL-to-UL switching to apply timing advances on UL transmissions. The impact is described in connection with FIG. 5.

For example, assume that downlink transmission A 527a is a PDCCH in subframe (n−4) that schedules a PUSCH transmission on UL. Accordingly, uplink transmission B 527b is a PUSCH transmitted on subframe n and downlink transmission C 527c is the HARQ-ACK of the PUSCH that is carried on subframe (n+4). Some subframes are disabled due to the half-duplex structure 533. In the example, DL transmission in subframe n and UL transmission in subframes (n−4) and (n+4) are disabled.

Some subframes are avoided or restricted for DL PDSCH transmission and PDSCH HARQ-ACK on UL 535. Continuing with the example, to allow DL to UL switching and apply a timing advance on an UL transmission in subframe n, a PDSCH on DL subframe (n−1) may be avoided and no UL HARQ-ACK report on subframe (n+3) is needed. If a PDSCH on DL subframe (n−1) is scheduled for an MTC device that is scheduled for UL transmission in subframe n, a guard period may be formed by dropping the last part of DL subframe (n−1), thus resulting in a reduced number of symbols for PDSCH allocation. However, DL subframe (n−1) may still schedule a PUSCH grant for UL transmission in subframe (n+3). Some subframes are avoided or restricted for UL transmission and DL PUSCH scheduling 531. Continuing with the example, an UL transmission (e.g. PUCCH and/or PUSCH) on subframes (n−3) and (n+5) should be avoided due to DL reception in subframe (n−4) and (n+4). Thus, an UL grant should not be scheduled on subframe (n+1).

Therefore, half-duplex operation has an impact not only on subframes with DL and UL transmissions of the UE, but may also restrict the use of the subframes that are immediately before and after the scheduled UL and DL subframes. This makes the scheduling very complicated if the MTC device half-duplex UL and DL subframes are configured randomly.

Figure 6:
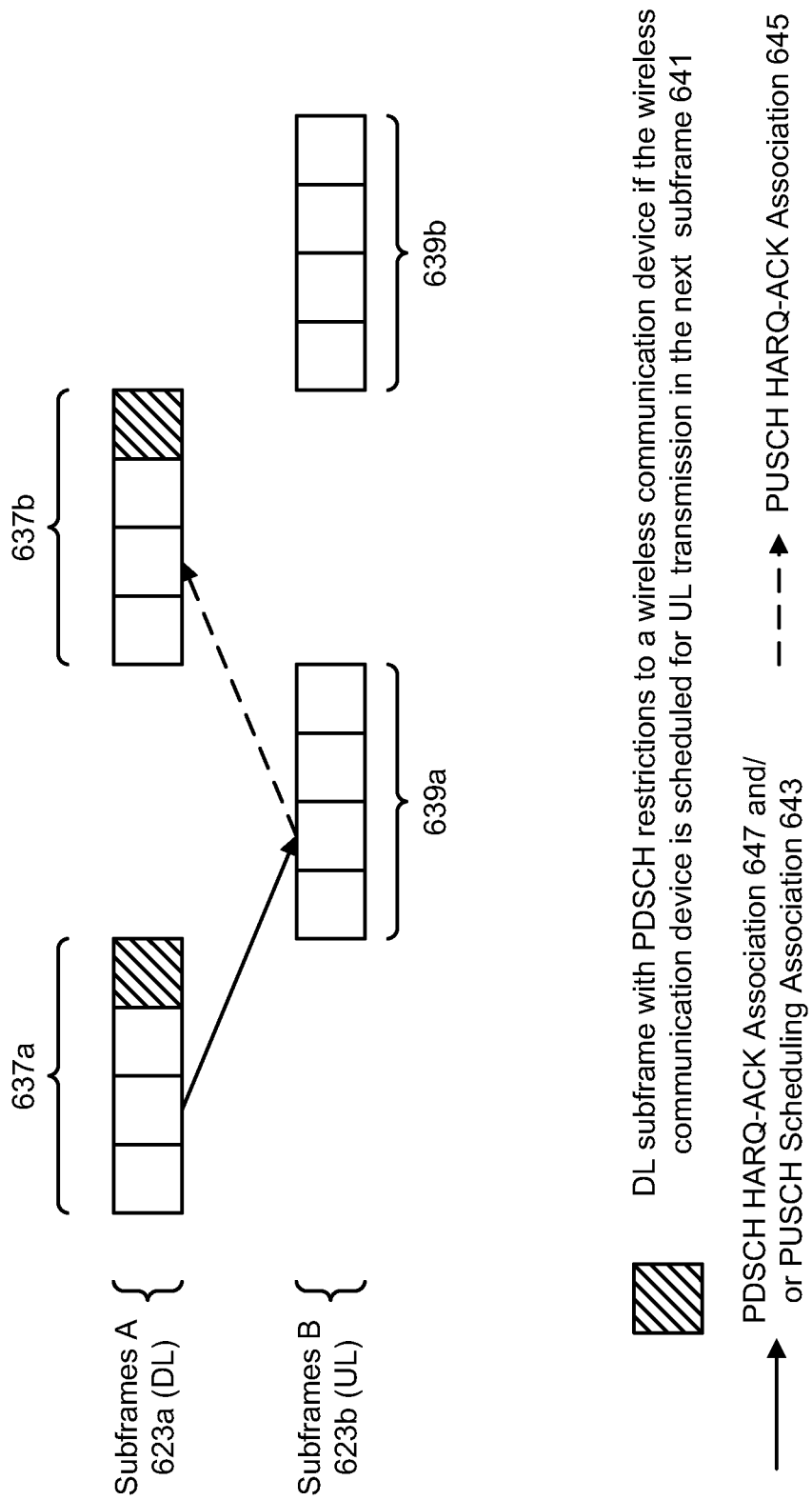
FIG. 6 is a diagram illustrating one example of a first approach in accordance with the systems and methods disclosed herein.

FIG. 6 is a diagram illustrating one example of a first approach in accordance with the systems and methods disclosed herein. In particular, FIG. 6 illustrates subframes A 623a and subframes B 623b. More specifically, FIG. 6 illustrates DL subframe group A 637a including four consecutive subframes 623, UL subframe group A 639a including four consecutive subframes 623, DL subframe group B 637b including four consecutive subframes 623 and UL subframe group B 639b including four consecutive subframes 623. One example of a PDSCH HARQ-ACK association 647 (e.g., timing) and/or a PUSCH scheduling association 643 (e.g., timing) is illustrated in FIG. 6. Furthermore, one example of a PUSCH HARQ-ACK association 645 (e.g., timing) is also illustrated in FIG. 6.

In a first approach, a regular UL and DL switching pattern may be implemented with standard 4 ms timing. In this first approach, as illustrated in FIG. 6, DL subframes A 623a and UL subframes B 623b may be aggregated into 4 ms DL subframe groups 637a-b. Thus, a wireless communication device 102 (e.g., an MTC device) may switch directions (between DL and UL) in a regular switching pattern with 8 ms periodicity. This may be done instead of randomly switching based on UL scheduling. This approach maintains an 8 ms RTT as given in 3GPP Release 8, 9 and 10. This simplifies scheduling and reduces continuous monitoring on the DL. Furthermore, this first approach preserves standard 4 ms UL-DL association timing.

With half-duplex operation in FDD networks, a guard period may be created by the wireless communication device 102 (e.g., UE, MTC device, etc.) by not receiving the last part of a DL subframe immediately preceding an UL subframe sent from the same wireless communication device 102. Thus, only one restriction may be utilized in this first approach. For example, there may be no PDSCH scheduled for a wireless communication device 102 (e.g., an MTC device) in the last DL subframe in a DL subframe group 637a-b if an UL transmission is scheduled for the wireless communication device 102 (e.g., MTC device) in the next subframe 641. Thus, no UL HARQ-ACK reporting may be needed in the last UL subframe in a UL subframe group 639a-b. Alternatively, a PDSCH may be scheduled with a reduced number of OFDM symbols allocated for the PDSCH for a wireless communication device 102 (e.g., MTC device) in the last DL subframe in a DL subframe group 637a-b if an UL transmission is scheduled for the wireless communication device 102 (e.g., MTC device) in the next subframe 641. The guard period and the number of OFDM symbols that may be allocated for the PDSCH of the given MTC may be determined (by the eNB 160, for example) based on the cell deployment (e.g., cell size and distance between the MTC device and the eNB 160). It should be noted that the last DL subframe in a DL subframe group 637a-b may still schedule a PUSCH transmission in the last UL subframe of the next UL subframe group 639a-b. The last subframe in a DL subframe group 637a-b may thus become a virtual switching subframe. Accordingly, FIG. 6 illustrates a half-duplex frame structure with a regular UL and DL switching pattern with scheduling restrictions.

The switching pattern may be provided by higher layer signaling to a wireless communication device 102 or to a group of wireless communication devices 102 (e.g., an MTC device or to a group of MTC devices). The switching pattern may be synchronized for a group of wireless communication devices (e.g., MTC devices) or may be maintained independently at each wireless communication device 102 (e.g., MTC device). In the latter case, where the switching pattern is maintained independently, a wireless communication device 102 (e.g., MTC device) may have its own timing on the switching pattern when a PDCCH targeted to the wireless communication device 102 (e.g., MTC device) is received, for example.

With the switching pattern in the first approach (as illustrated in FIG. 6, for example), the maximum number PDSCH HARQ processes for wireless communication devices 102 (e.g., MTC devices) is reduced to 3 if the last DL subframe is not used for a PDSCH transmission for a wireless communication device 102 (e.g., MTC device). Furthermore, the maximum number PDSCH HARQ processes for wireless communication devices 102 (e.g., MTC devices) may be reduced to 4 if the last DL subframe is used for PDSCH transmission with a reduced number of OFDM symbols for a wireless communication device 102 (e.g., MTC device). Additionally, the maximum number of PUSCH HARQ processes may be reduced to 4. Since MTC devices have a lower data rate, further constraints may be applied. For example, each wireless communication device 102 (e.g., MTC device) may use only one subframe 623 in a DL subframe group 637a-b and thus one subframe in the corresponding UL subframe group 639a-b. In this case, the restriction on the last subframe in a DL subframe group may not apply since an UL subframe is not immediately after the DL subframe for the same wireless communication device 102 (e.g., MTC device). Once it is configured, the wireless communication device 102 (e.g., MTC device) may stop monitoring other DL subframes 623b in a DL subframe group 637a-b.

One benefit of this approach may be backward compatibility, since the same association timing may be used as in FDD. In known half duplex in FDD-LTE, this association timing may be achieved by eNB 160 scheduling. However, a UE in known approaches does not know the switching patterns and needs to monitor for a downlink transmission in any subframe that is not scheduled for UL transmission. Therefore, the switching pattern and rules in accordance with the first approach may be specified for half-duplex operation of wireless communication devices 102 (e.g., MTC devices).

Figure 7:
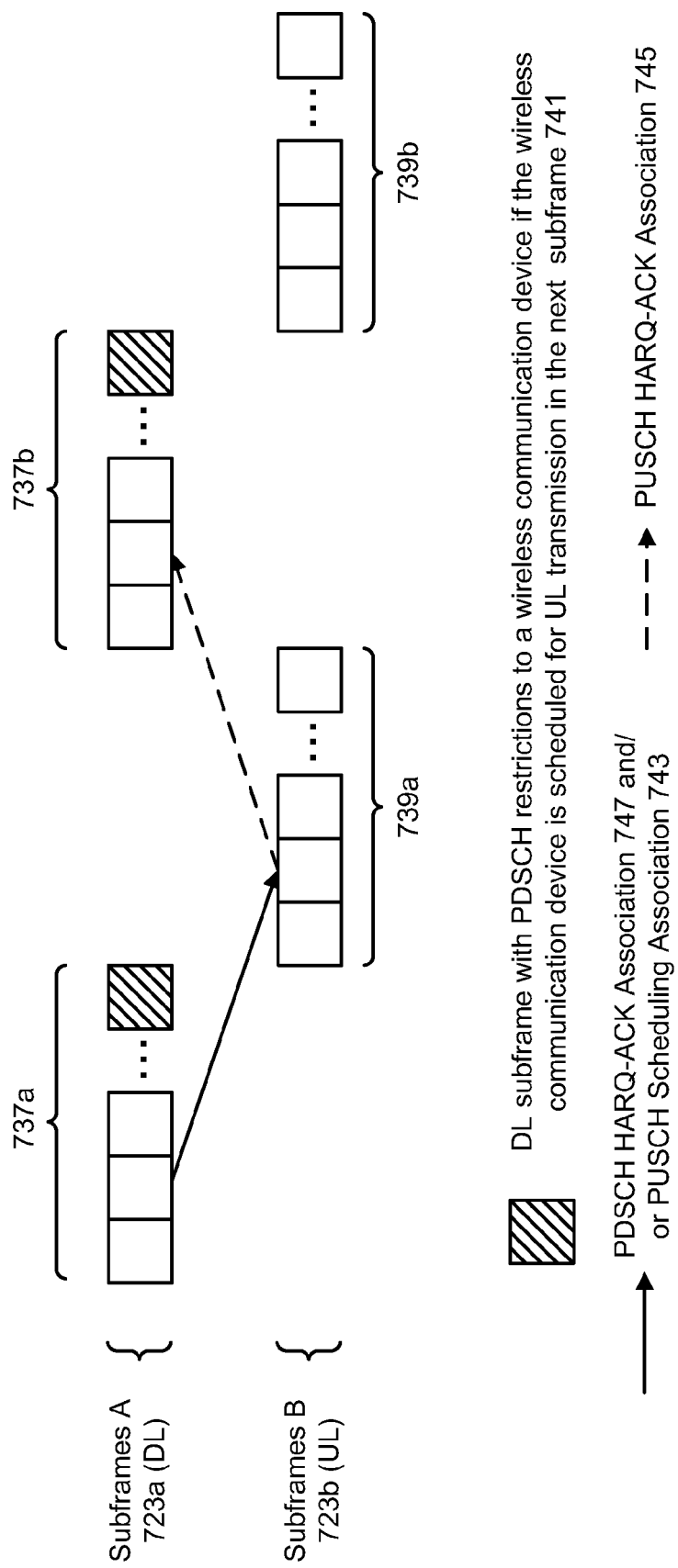
FIG. 7 is a diagram illustrating one example of a second approach in accordance with the systems and methods disclosed herein.

FIG. 7 is a diagram illustrating one example of a second approach in accordance with the systems and methods disclosed herein. For example, FIG. 7 illustrates one example of a half-duplex frame structure with a regular UL and DL switching pattern with extended association timing. In particular, FIG. 7 illustrates subframes A 723a and subframes B 723b. More specifically, FIG. 7 illustrates DL subframe group A 737a including a number of (e.g., 4+k) consecutive subframes 723, UL subframe group A 739a including a number of (e.g., 4+k) consecutive subframes 723, DL subframe group B 737b including a number of (e.g., 4+k) consecutive subframes 723 and UL subframe group B 739b including a number of (e.g., 4+k) consecutive subframes 723. One example of a PDSCH HARQ-ACK association 747 (e.g., timing) and/or a PUSCH scheduling association 743 (e.g., timing) is illustrated in FIG. 7. Furthermore, one example of a PUSCH HARQ-ACK association 745 (e.g., timing) is also illustrated in FIG. 7.

In the second approach, association timings may be extended to form a larger DL subframe group and a larger UL subframe group. Because MTC traffic may not be delay sensitive, association timing may be extended. An offset may be applied to one or more (e.g., all) association timings, including PDSCH HARQ-ACK associations (e.g., PDSCH HARQ-ACK association 747), PUSCH scheduling associations (e.g., PUSCH scheduling association 743) and PUSCH HARQ-ACK associations (e.g., PUSCH HARQ-ACK association 745). For example, assuming that an offset of k subframes is used, the MTC UL and DL switching pattern may be extended to have a periodicity and RTT of 2*(4+k), with (4+k) subframes 723 in DL subframe groups 737a-b and (4+k) subframes 723 UL subframe groups 739a-b, as illustrated in FIG. 7.

The offset may be signaled (by an eNB 160) via higher layer signaling (e.g., RRC signaling). Additionally or alternatively, the offset may be signaled in synchronization and/or broadcasting signals. Thus, the second approach may be an extension of the first approach, with similar benefits and constraints. As similarly described in connection with FIG. 6, for example, there may be no PDSCH scheduled for a wireless communication device 102 (e.g., an MTC device) in the last DL subframe in a DL subframe group 737a-b if an UL transmission is scheduled for the wireless communication device 102 (e.g., MTC device) in the next subframe 741. Alternatively, a PDSCH may be scheduled with a reduced number of OFDM symbols allocated for the PDSCH for a wireless communication device 102 (e.g., MTC device) in the last DL subframe in a DL subframe group 737a-b if an UL transmission is scheduled for the wireless communication device 102 (e.g., MTC device) in the next subframe 741. The guard period and the number of OFDM symbols that may be allocated for the PDSCH of the given wireless communication device 102 (e.g., MTC device) may be determined (by the eNB 160, for example) by the cell deployment (e.g., cell size and distance between the wireless communication device 102 (e.g., MTC device) and the eNB 160).

With extended association timings for wireless communication devices 102 (e.g., MTC devices), the wireless communication devices 102 (e.g., MTC devices) may need to be managed separately from regular UEs due to different HARQ processes and scheduling timings. If wireless communication devices 102 (e.g., MTC devices) are managed in a different group, they may be treated as a new carrier with separate (e.g., independent) timing and HARQ-ACK processes. Furthermore, wireless communication devices 102 (e.g., MTC devices) may operate in a subband of an existing carrier, which is thus a carrier type beyond those specified by 3GPP Release 8, 9 and 10 specifications. This carrier may be operated independently and have its own timing and HARQ-ACK processes.

With the switching pattern described in connection with FIG. 7, the maximum PDSCH HARQ processes for wireless communication devices 102 (e.g., MTC devices) may be (4+k−1) if the last DL subframe is not used for PDSCH transmission for a wireless communication device 102 (e.g., MTC device). Furthermore, the maximum number of PDSCH HARQ processes for wireless communication devices (e.g., MTC devices) may be (4+k) if the last DL subframe is used for PDSCH transmission with a reduced number of OFDM symbols for a wireless communication device 102 (e.g., MTC device). Additionally, the number of PUSCH HARQ processes may be reduced to (4+k). Further constraints may be applied. For example, each wireless communication device 102 (e.g., MTC device) may use only one subframe in a DL subframe group 737a-b, and thus one subframe in the corresponding UL subframe group 739a-b. In this case, the restriction on the last subframe in a DL subframe group 737a-b may not apply since an UL subframe 723b is not immediately after the DL subframe 723a for the same wireless communication device 102 (e.g., MTC device). Once it is configured, the wireless communication device 102 (e.g., MTC device) may stop monitoring other DL subframes 723a in a DL subframe group 737a-b.

FIG. 8 is a diagram illustrating one example of a third approach in accordance with the systems and methods disclosed herein. For example, FIG. 8 illustrates one example of a guard period 849 formed with an offset. In particular, FIG. 8 illustrates subframes A 823a and subframes B 823b. More specifically, FIG. 8 illustrates DL subframe group A 837a including a number of (e.g., six) consecutive subframes 823 (including two subframes for a GP, for example), an UL subframe group 839 including a number of (e.g., four) consecutive subframes 823 and DL subframe group B 837b including a number of (e.g., six) consecutive subframes 823 (including two subframes for a GP, for example). One example of a PDSCH HARQ-ACK association 847 (e.g., timing) and/or a PUSCH scheduling association 843 (e.g., timing) is illustrated in FIG. 8. Furthermore, one example of a PUSCH HARQ-ACK association 845 (e.g., timing) is also illustrated in FIG. 8.

In a third approach, different association timings may be applied to form a guard period. For example, an MTC device may not be as powerful as a regular UE. Accordingly, the MTC device may require a comparatively longer time for processing a DL reception. However, an eNB 160 may provide feedback without a minimum delay in order to reduce the RTT. Thus, in a third approach, different offsets may be applied to different association timings.

In one case, no offset may be introduced for a PUSCH HARQ-ACK association 845 (e.g., feedback timing) and the same offset may be applied to both a PDSCH HARQ-ACK association 847 (e.g., timing) and a PUSCH scheduling association 843 (e.g., timing). For example, assuming an offset is i, with DL and UL subframe grouping, a guard period 849 of i may be formed between the DL subframe group 837a and the UL subframe group 839. The wireless communication device 102 (e.g., MTC device) may not expect any PDSCH or PUSCH scheduling in the guard period 849.

In another case, an offset of k may be introduced for the PUSCH HARQ-ACK association 845 (e.g., feedback timing), and an offset of (k+i) may be applied to the PDSCH HARQ-ACK association 847 (e.g., timing) and the PUSCH scheduling association 843 (e.g., timing). With DL and UL subframe grouping, a guard period 849 of i may be formed between a DL subframe group 837a and an UL subframe group 839. The wireless communication device 102 (e.g., MTC device) may not expect any PDSCH or PUSCH scheduling in the guard period 849.

Accordingly, FIG. 8 illustrates one example of the third approach with standard PUSCH HARQ-ACK feedback timing (e.g., an offset of 0 or no offset) and an offset of 2 on both the PDSCH HARQ-ACK association 847 (e.g., timing) and PUSCH scheduling association 843 (e.g., timing). Thus, a guard period 849 of 2 subframes may be formed for DL-to-UL switching.

Figure 9:
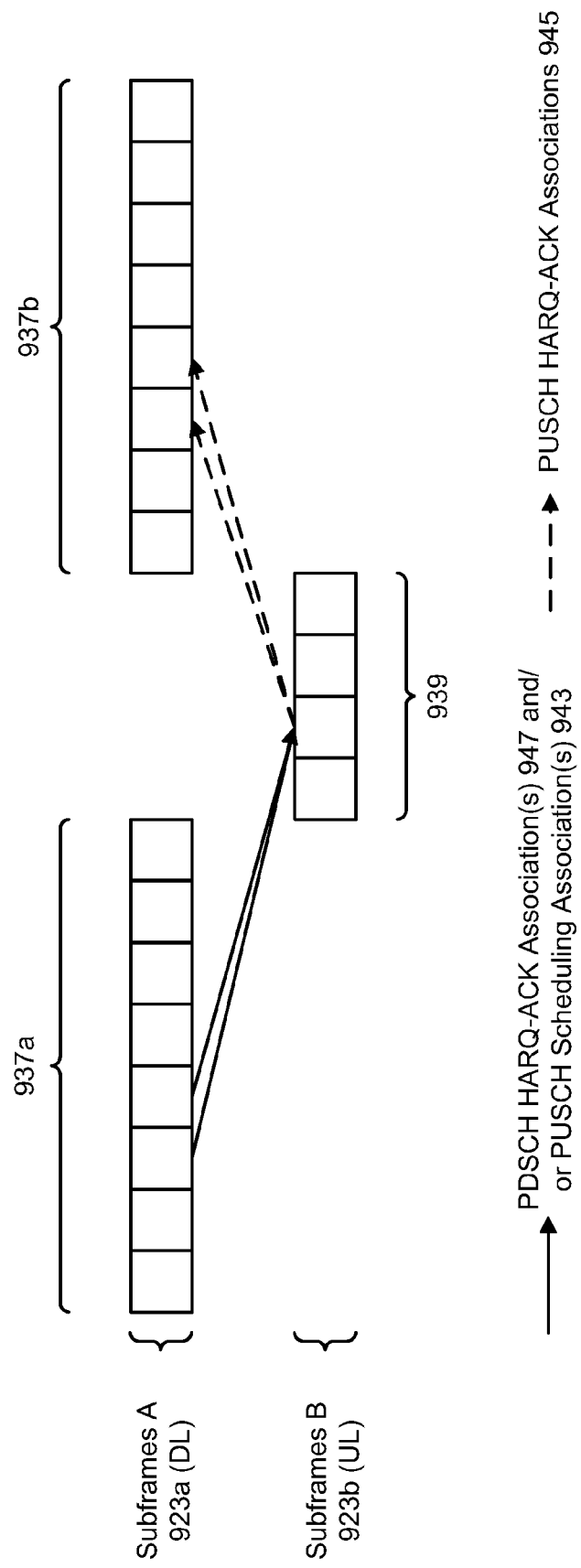
FIG. 9 is a diagram illustrating one example of a fourth approach in accordance with the systems and methods disclosed herein.

FIG. 9 is a diagram illustrating one example of a fourth approach in accordance with the systems and methods disclosed herein. For example, FIG. 9 illustrates one example of group association mapping. In particular, FIG. 9 illustrates subframes A 923a and subframes B 923b. More specifically, FIG. 9 illustrates DL subframe group A 937a including a number of (e.g., eight) consecutive subframes 923, an UL subframe group 939 including a number of (e.g., four) consecutive subframes 923 and DL subframe group B 937b including a number of (e.g., eight) consecutive subframes 923. One example of one or more PDSCH HARQ-ACK associations 947 (e.g., timing) and/or one or more PUSCH scheduling associations 943 (e.g., timing) are illustrated in FIG. 9. Furthermore, one example of PUSCH HARQ-ACK associations 945 (e.g., timing) is also illustrated in FIG. 9.

In a fourth approach, group association mappings may be applied (by the wireless communication device 102 and/or the eNB 160) for unbalanced UL and DL communications. The foregoing approaches may assume that the same number of subframes are configured for DL and UL. They may or may not also assume that the same timing and offset are used for each type of DL and UL association. For a wireless communication device 102 (e.g., MTC device), an UL and DL switching pattern may be applied with different offsets in different subframes 923. Furthermore, group linkage may be used (e.g., one or more DL subframes 923a may be mapped to one UL subframe 923b, and vice versa). To maintain a constant linkage, the PUSCH HARQ-ACK and PUSCH scheduling subframe may be at the same position in the UL-DL pattern. FIG. 9 illustrates one example of two DL subframes (e.g., the third and fourth subframes 923a in DL subframe group A 937a) mapped to one UL subframe (e.g., the second subframe 923b in the UL subframe group 939) with variable association timings. Additional and/or alternative group linkings may be implemented.

In a fifth approach, association timings may be applied to sync with a radio frame structure. In the association timing of FDD-LTE in 3GPP Release 8, 9 and 10 specifications, the RRT is 8 TTIs (e.g., a minimum delay for LTE systems, for example). However, the 8 ms RTT is not synchronized with the 10 ms radio frame structure. It may be difficult to have signaling with an 8 ms periodicity pattern, since it is continuously shifting in each radio frame. Therefore, it may be beneficial to sync the RTT for a wireless communication device 102 (e.g., MTC device) with a radio frame (e.g., 10 ms).

For example, an offset k=1 may be applied in accordance with the second approach given above. In this case, all association timings become 5 ms instead of 4 ms, for instance. In another example, an offset of 2 may be applied to PDSCH HARQ-ACK and PUSCH scheduling only, as illustrated in FIG. 8.

Figure 10:
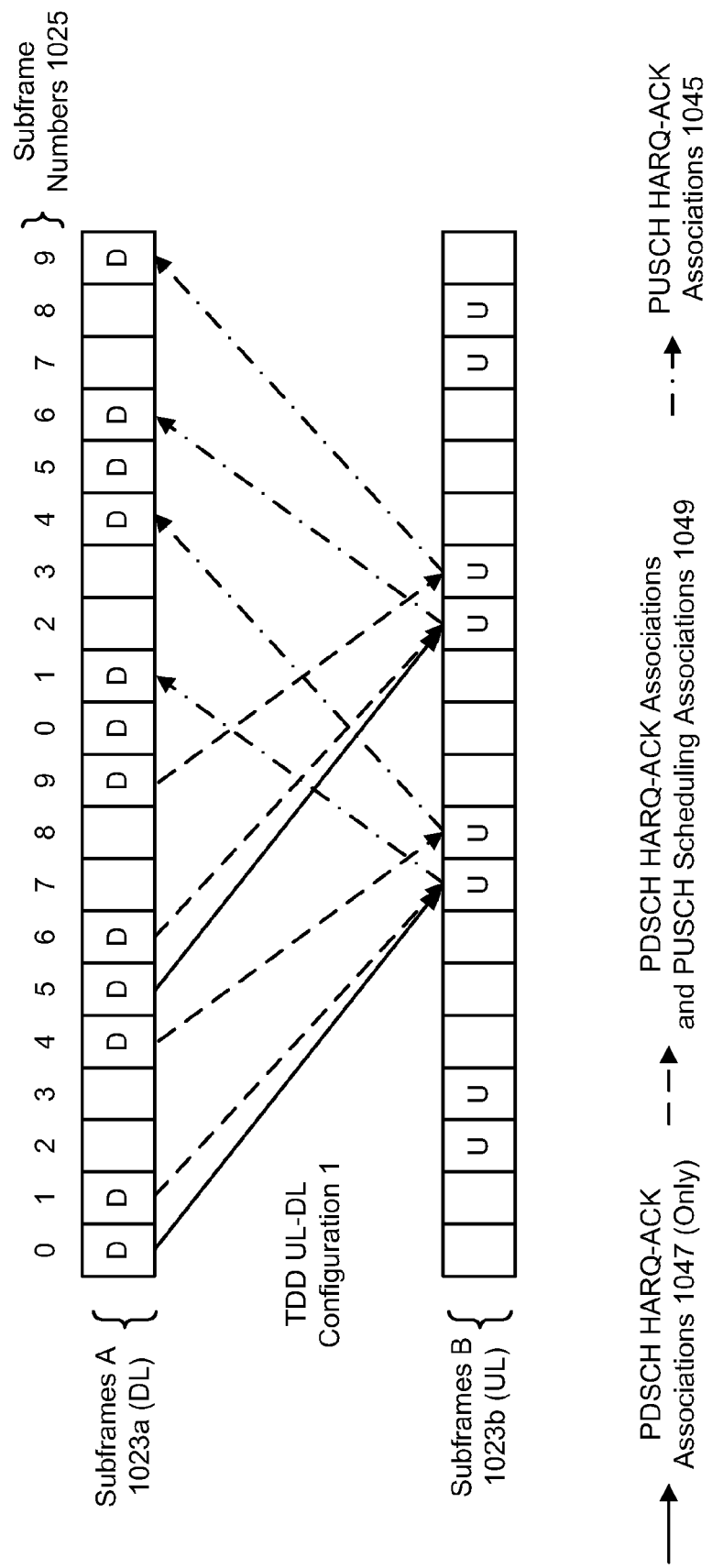
FIG. 10 is a diagram illustrating one example of a sixth approach in accordance with the systems and methods disclosed herein.

FIG. 10 is a diagram illustrating one example of a sixth approach in accordance with the systems and methods disclosed herein. For example, FIG. 10 illustrates one example of applying a TDD UL-DL configuration on FDD-LTE. In particular, FIG. 10 illustrates subframes A 1023a and subframes B 1023b with corresponding subframe numbers 1025. Examples of PDSCH HARQ-ACK associations 1047 (e.g., timing), examples of PDSCH HARQ-ACK associations and PUSCH scheduling associations 1049 (e.g., timing) and examples of PUSCH HARQ-ACK associations 1045 (e.g., timing) are illustrated in FIG. 10.

In a sixth approach, TDD configurations may be applied to an FDD-LTE network. TDD-LTE utilizes a half-duplex structure inherently, and may have different UL-DL configurations. In particular, seven UL-DL configurations are specified in 3GPP specifications, as shown in Table (1) below. In Table (1), "D" denotes a DL subframe, "S" denotes a special subframe and "U" denotes an UL subframe.

TABLE (1)

| UL-DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TDD-LTE has periodicity of either 5 ms or 10 ms. Thus, it is synchronized with the radio frame structure. Thus, applying TDD configurations on FDD-LTE is another option to support half-duplex communications on FDD-LTE.

TDD-LTE operates on the same carrier for UL and DL. With FDD, DL and UL are on different carriers. However, the same association timing of a TDD configuration may be applied to wireless communication devices 102 (e.g., MTC devices) in FDD networks. There may be no scheduling conflicts if wireless communication devices 102 (e.g., MTC devices) follow the TDD timing. FIG. 10 illustrates one example of applying TDD UL-DL configuration 1 to FDD-LTE. It should be noted, however, that there may be no special subframes as in standard TDD configurations. However, there may be restrictions in the last DL subframe in a DL subframe group (e.g., a guard period may be created by the wireless communication device 102 (e.g., MTC device) by not receiving the last part of a DL subframe that immediately precedes an UL subframe from the same wireless communication device 102.

For the same DL or UL subframe, the timings on a TDD configuration may be (e.g., is likely to be) different from the FDD timing. This may cause problems. However, if wireless communication devices 102 (e.g., MTC devices) are managed in a different group, they may be treated as a separate carrier with separate timing and HARQ-ACK processes. Furthermore, wireless communication devices 102 (e.g., MTC devices) may operate in a subband of an existing carrier, which is thus a carrier type beyond those given by 3GPP Release 8, 9 and 10 specifications. This carrier may be operated independently and have separate timing and HARQ-ACK processes.

Different types of wireless communication devices 102 (e.g., MTC devices) may have different traffic characteristics, and may require different UL-DL configurations. The same TDD UL-DL configuration may be applied for all wireless communication devices 102 (e.g., MTC devices). Alternatively, different TDD UL-DL configurations may be applied to different wireless communication devices 102 (e.g., MTC devices). If multiple TDD UL-DL configurations are applied, a wireless communication device 102 (e.g., MTC device) may follow its own configured TDD UL-DL configuration. If multiple TDD UL-DL configurations are applied to different wireless communication devices 102 (e.g., MTC devices), the HARQ-ACK processes of different TDD configurations may be maintained separately. Thus, each TDD UL-DL configuration may be considered to be an independent carrier or new carrier type.

If a TDD UL-DL configuration is applied to a wireless communication device 102 (e.g., MTC device) or a group of wireless communication devices 102 (e.g., MTC devices), the actual UL-DL configuration may be indicated to the device by one or more of higher layer signaling (e.g., RRC signaling), through synchronization and broadcasting channels, etc. If multiple TDD UL-DL configurations are used for wireless communication devices 102 (e.g., MTC devices), the actual UL-DL configurations may be indicated to the device by one or more of higher layer signaling (e.g., RRC signaling), through synchronization and broadcasting channels, etc.

Alternatively, instead of configuring different TDD UL-DL configurations for different types of wireless communication devices 102 (e.g., MTC devices), the eNB may allow flexible and dynamic UL-DL configurations of wireless communication devices 102 (e.g., MTC devices). In this case, the HARQ-ACK processes of wireless communication devices 102 (e.g., MTC devices) in the same cell may be managed together as one carrier or as a new carrier. This may be achieved by applying separate reference configurations on PDSCH and PUSCH timing.

For example, the eNB 160 may indicate (e.g., signal) a first reference TDD UL-DL configuration for PDSCH HARQ-ACK timing and indicate (e.g., signal) a second reference TDD UL-DL configuration for PUSCH scheduling and PUSCH HARQ-ACK timing. The set of UL subframes in the first reference configuration may be a subset of the set of UL subframes in the second reference configuration. Furthermore, the set of DL subframes in the second reference configuration may be a subset of the set of DL subframes in the first reference configuration. With separate timings for PDSCH and PUSCH, the eNB 160 may dynamically select the directions in some subframes for wireless communication devices 102 (e.g., MTC devices) without any conflict and any timing changes.

If a first TDD UL-DL configuration and a second TDD UL-DL configuration are used for wireless communication devices 102 (e.g., MTC devices), the first and the second UL-DL configurations may be indicated by the eNB 160 to the wireless communication devices 102 by one or more of higher layer signaling (e.g., RRC signaling), through synchronization and broadcasting channels etc.

Figure 11:
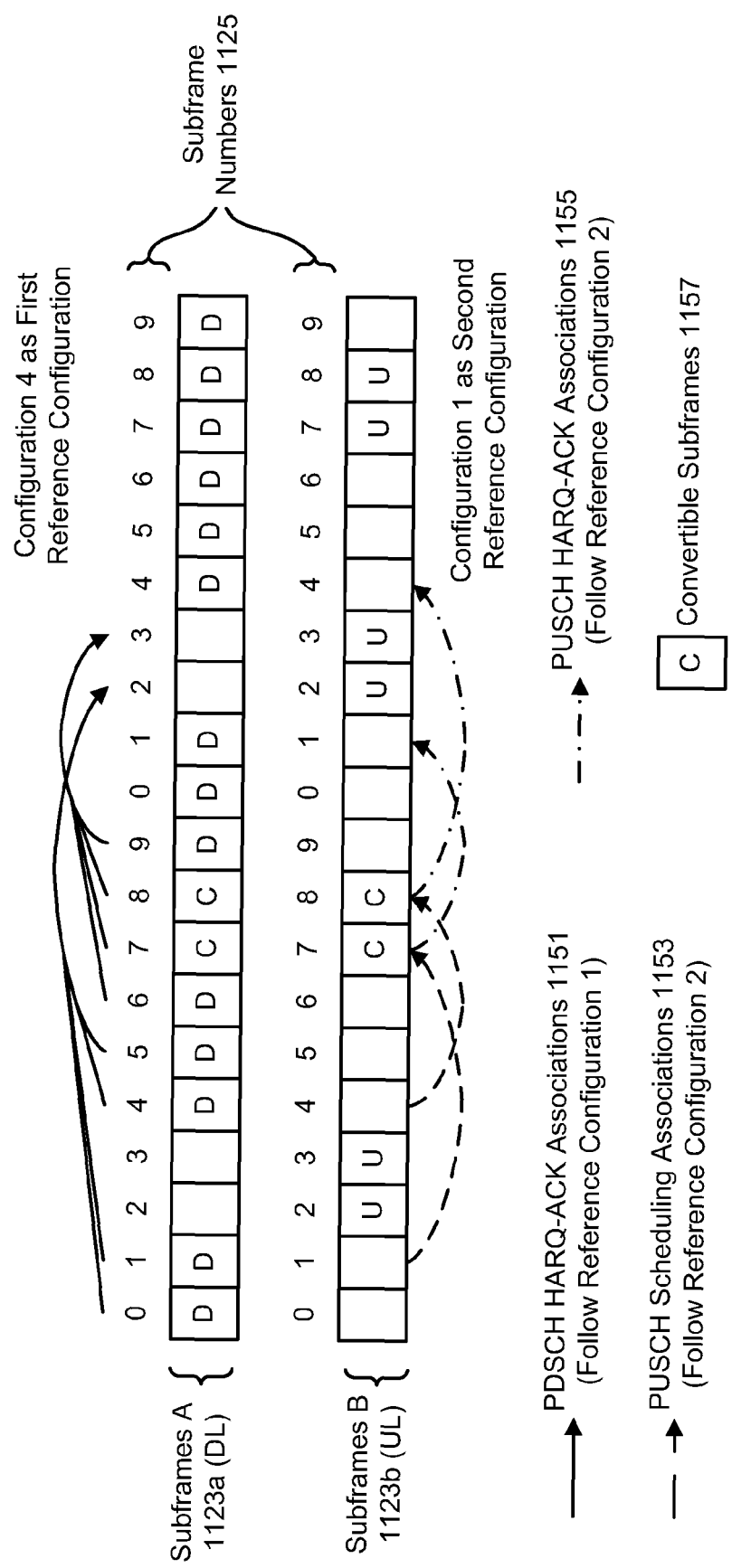
FIG. 11 is a diagram illustrating another example of the sixth approach in accordance with the systems and methods disclosed herein.

FIG. 11 is a diagram illustrating another example of the sixth approach in accordance with the systems and methods disclosed herein. In particular, FIG. 11 illustrates subframes A 1123a and subframes B 1123b with corresponding subframe numbers 1125. Examples of PDSCH HARQ-ACK associations 1151 (e.g., timing), PUSCH scheduling associations 1153 (e.g., timing) and PUSCH HARQ-ACK associations 1155 (e.g., timing) are illustrated in FIG. 11. Additionally, convertible subframes 1157 are denoted with a "C" in FIG. 11. It should also be noted that "D" denotes downlink subframes and "U" denotes uplink subframes in FIG. 11.

One or more wireless communication devices 102 and/or the eNB 160 may apply one or more of the TDD uplink-downlink UL-DL configurations 0-6 (and/or other configurations) with one or more corresponding associations for half-duplex operations. In other words, one or more UL subframe groups may correspond to a first carrier and one or more DL subframe groups may correspond to a second carrier. One or more of the TDD UL-DL configurations 0-6 (or other configuration(s)) with corresponding associations (e.g., PDSCH HARQ-ACK associations, PUSCH scheduling associations and/or PUSCH HARQ-ACK associations) may be applied by the eNB 160 and/or the wireless communication device(s) 102 for half-duplex operations. This may be done in combination with one or more of the methods 200, 300 described above.

The wireless communication device 102 and/or the eNB 160 may utilize a half-duplex frame structure including one or more convertible subframes. The convertible subframe(s) may be based on a range of Time-Division Duplexing (TDD) uplink-downlink (UL-DL) configurations. For example, the one or more wireless communication devices 102 and the eNB 160 may apply a PDSCH association corresponding to a first TDD UL-DL configuration. Furthermore, the one or more wireless communication devices 102 and the eNB 160 may apply a PUSCH scheduling association and a PUSCH HARQ-ACK association corresponding to a second TDD UL-DL configuration. In other words, the one or more UL subframe groups may correspond to a first carrier and the one or more DL subframe groups may correspond to a second carrier. An allocation (indicated by the eNB 160 to the wireless communication device 102, for example) may allow dynamic subframe usage, where one or more subframes may be utilized as UL or DL (e.g., convertible subframes). If a convertible subframe is converted from DL to UL, and the convertible subframe is immediately after a subframe that is allocated for DL transmission, a guard period may be created by the wireless communication device 102 (e.g., MTC device) by not receiving the last part of a DL subframe immediately preceding the converted UL subframe from the same wireless communication device 102 (e.g., MTC device). For example, a dynamic range between a first TDD UL-DL configuration and a second TDD UL-DL configuration may be indicated and/or utilized by the eNB 160 and/or one or more wireless communication devices 102. For instance, an eNB 160 and/or wireless communication device 102 may apply a first TDD UL-DL configuration for the PDSCH HARQ-ACK association(s) (e.g., timing) and may apply a second TDD UL-DL configuration for the PUSCH scheduling association(s) and/or PUSCH HARQ-ACK association(s) (e.g., timing). This may be done in combination with one or more of the methods 200, 300 described above.

In FIG. 11, for example, the eNB 160 provide a maximum uplink allocation of 40% and a maximum downlink allocation of 80% due to MTC traffic characteristics. In this example, the eNB 160 may set TDD UL-DL Configuration 4 with 2 UL subframes and a 10 ms periodicity as the first reference configuration for PDSCH HARQ-ACK reporting, so that all PDSCH HARQ-ACK may be reported in subframes 2 and 3 in the uplink carrier. On the other hand, the eNB 160 may set TDD UL-DL configuration 1 with 2 UL subframes in a 5 ms periodicity as the second reference configuration, allowing PUSCH scheduling in up to 4 UL subframes in every 10 ms. With half-duplex operation in an FDD network, a guard period may be created by the wireless communication device 102, by not receiving the last part of a DL subframe immediately preceding an UL subframe from the same wireless communication device 102 (e.g., MTC device). Convertible subframes 1157 may be subframes that can be dynamically allocated by the eNB 160 to either DL or UL, depending on association timing. For example, the eNB 160 may signal an allocation to the wireless communication device(s) 102. This provides flexibility for resource allocation without complicated signaling.

Moreover, with a given TDD UL-DL configuration, a wireless communication device 102 (e.g., MTC device) may be signaled by the eNB 160 to monitor only a subset of the subframes. This may reduce the number of HARQ-ACK processes in a wireless communication device 102 (e.g., MTC device) and may provide more power savings. In one example (e.g., setting), only one HARQ-ACK process may be supported on a wireless communication device 102 (e.g., MTC device).

If the reference TDD UL-DL configurations are applied to a wireless communication device 102 (e.g., MTC device) or to a group of wireless communication devices 102 (e.g., MTC devices), the reference UL-DL configurations may be provided (e.g., signaled) to the wireless communication devices 102 by one or more of higher layer signaling (e.g., RRC signaling), through synchronization and broadcasting channels, etc.

The eNB 160 may additionally or alternatively restrict the subframes used for wireless communication devices 102 (e.g., MTC devices). Thus, only a subset of the subframes may be utilized in a TDD UL-DL configuration. A wireless communication device 102 (e.g., MTC device) may have a reduced number of HARQ processes. For example, a wireless communication device 102 (e.g., MTC device) may have a single HARQ process such that an additional packet cannot be transmitted until the HARQ process of the current packet is finished.

For a HARQ-ACK process, it may be beneficial to maintain the same subframe location in a radio frame. Thus, the TDD UL-DL configurations with 10 ms RTT may be utilized for configurations with 5 ms periodicity. On the other hand, since wireless communication device 102 (e.g., MTC device) traffic may not be delay sensitive, configurations with 10 ms periodicity may be utilized. With TDD configurations with 10 ms periodicity, the amount of DL-UL switching may be reduced (e.g., minimized).

Figure 12:
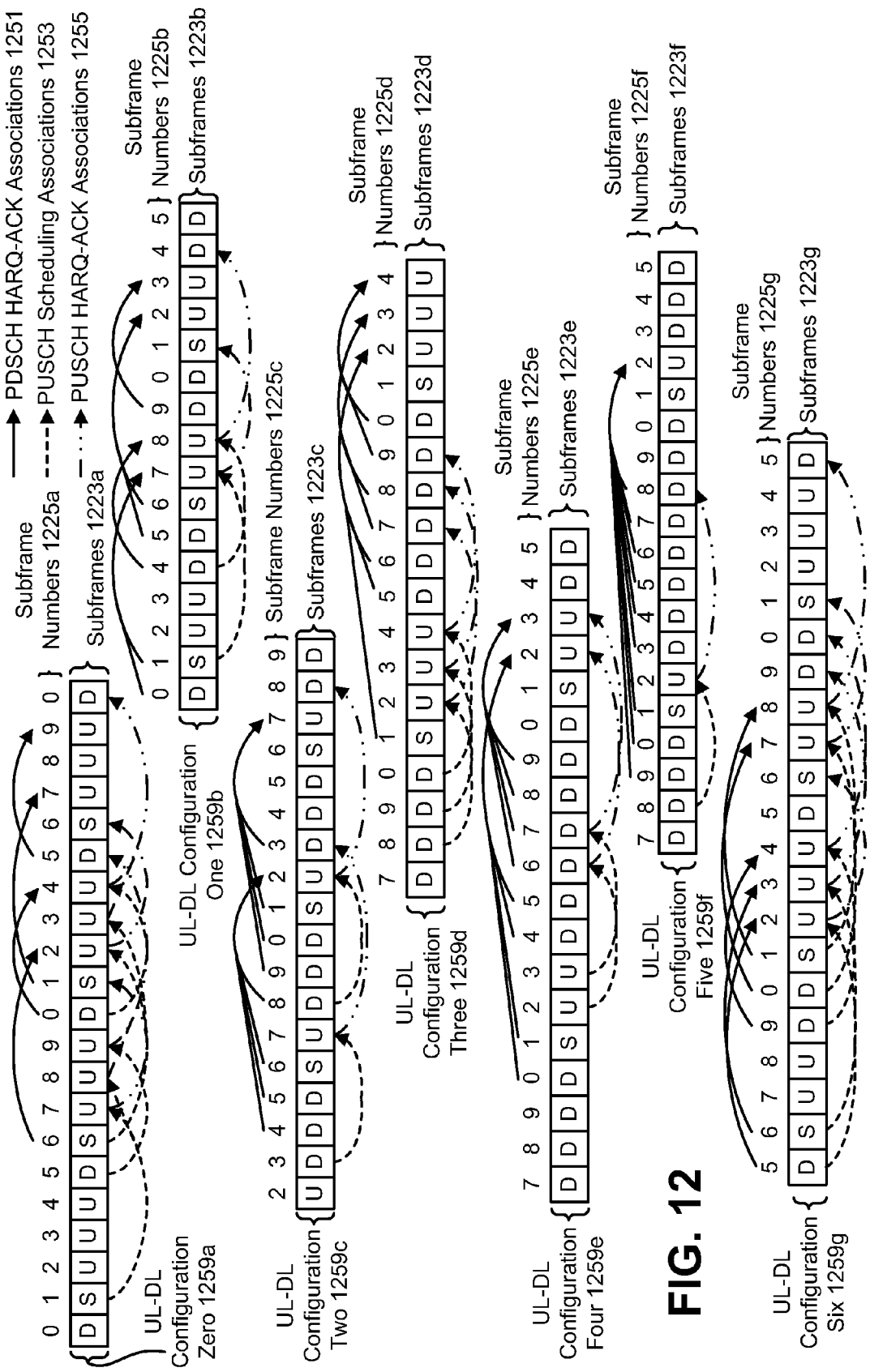
FIG. 12 is a diagram illustrating some Time-Division Duplexing (TDD) uplink-downlink (UL-DL) configurations that may be applied in accordance with the systems and methods disclosed herein.

FIG. 12 is a diagram illustrating some TDD UL-DL configurations 1259a-g that may be applied in accordance with the systems and methods disclosed herein. In particular, FIG. 12 illustrates UL-DL configuration zero 1259a (e.g., "UL-DL configuration 0") with subframes 1223a and subframe numbers 1225a, UL-DL configuration one 1259b (e.g., "UL-DL configuration 1") with subframes 1223b and subframe numbers 1225b, UL-DL configuration two 1259c (e.g., "UL-DL configuration 2") with subframes 1223c and subframe numbers 1225c and UL-DL configuration three 1259d (e.g., "UL-DL configuration 3") with subframes 1223d and subframe numbers 1225d. FIG. 12 also illustrates UL-DL configuration four 1259e (e.g., "UL-DL configuration 4") with subframes 1223e and subframe numbers 1225e, UL-DL configuration five 1259f (e.g., "UL-DL configuration 5") with subframes 1223f and subframe numbers 1225f and UL-DL configuration six 1259g (e.g., "UL-DL configuration 6") with subframes 1223g and subframe numbers 1225g.

FIG. 12 further illustrates PDSCH HARQ-ACK associations 1251 (e.g., PDSCH HARQ-ACK feedback on PUCCH or PUSCH associations), PUSCH scheduling associations 1253 (e.g., downlink scheduling for PUSCH transmission associations) and PUSCH HARQ-ACK associations 1255 (e.g., PUSCH HARQ-ACK feedback on PHICH or PDCCH associations) corresponding to each UL-DL configuration 1259a-g. It should be noted that some of the radio frames illustrated in FIG. 12 have been truncated for convenience.

One or more of the UL-DL configurations 1259a-g illustrated in FIG. 12 may be applied in accordance with the systems and methods disclosed herein. For example, one or more of the UL-DL configurations 1259a-g may be applied in a similar manner as described in connection with FIG. 10 and/or FIG. 11. For instance, one or more of the UL-DL configurations 1259a-g may be a reference configuration as described in connection with FIG. 11.

Figure 13:
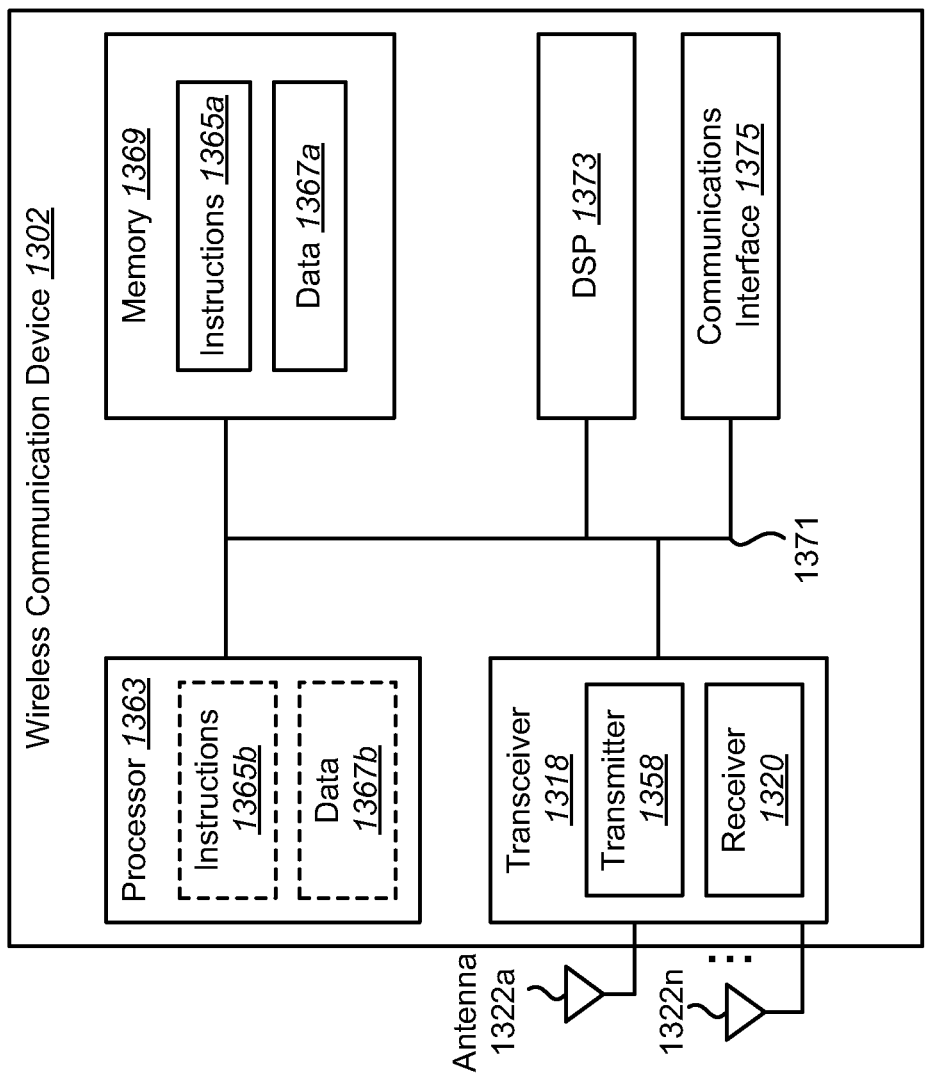
FIG. 13 illustrates various components that may be utilized in a wireless communication device.

FIG. 13 illustrates various components that may be utilized in a wireless communication device 1302. The wireless communication device 1302 described in connection with FIG. 13 may be implemented in accordance with the wireless communication device 102 described in connection with FIG. 1. The wireless communication device 1302 includes a processor 1363 that controls operation of the wireless communication device 1302. The processor 1363 may also be referred to as a central processing unit (CPU). Memory 1369, which may include read-only memory (ROM), random access memory (RAM), a combination of the two or any type of device that may store information, provides instructions 1365a and data 1367a to the processor 1363. A portion of the memory 1369 may also include non-volatile random access memory (NVRAM). Instructions 1365b and data 1367b may also reside in the processor 1363. Instructions 1365b and/or data 1367b loaded into the processor 1363 may also include instructions 1365a and/or data 1367a from memory 1369 that were loaded for execution or processing by the processor 1363. The instructions 1365b may be executed by the processor 1363 to implement the method 200 described above.

The wireless communication device 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the wireless communication device 1302 are coupled together by a bus system 1371, which may include a power bus, a control signal bus and a status signal bus, in addition to a data bus. However, for the sake of clarity, the various buses are illustrated in FIG. 13 as the bus system 1371. The wireless communication device 1302 may also include a digital signal processor (DSP) 1373 for use in processing signals. The wireless communication device 1302 may also include a communications interface 1375 that provides user access to the functions of the wireless communication device 1302. The wireless communication device 1302 illustrated in FIG. 13 is a functional block diagram rather than a listing of specific components.

Figure 14:
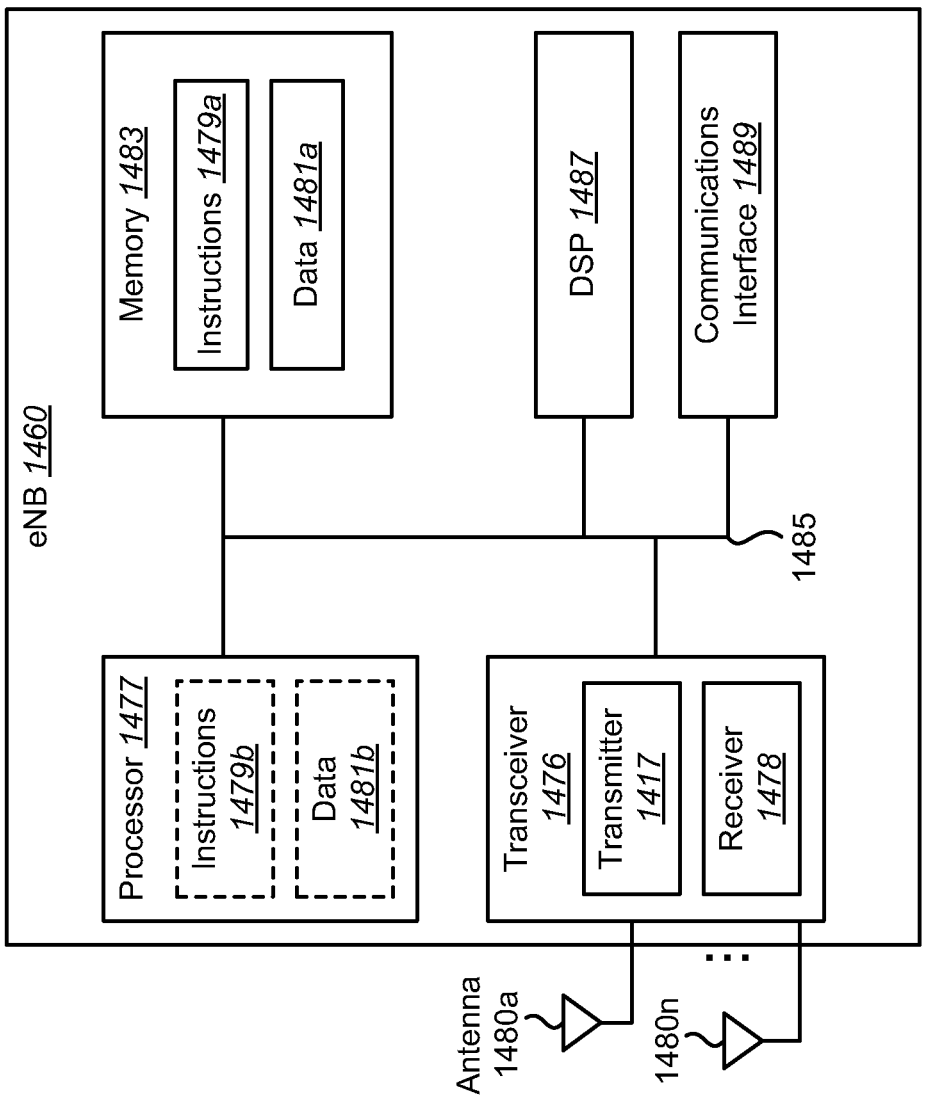
FIG. 14 illustrates various components that may be utilized in an eNB.

FIG. 14 illustrates various components that may be utilized in an eNB 1460. The eNB 1460 described in connection with FIG. 14 may be implemented in accordance with the eNB 160 described in connection with FIG. 1. The eNB 1460 includes a processor 1477 that controls operation of the eNB 1460. The processor 1477 may also be referred to as a central processing unit (CPU). Memory 1483, which may include read-only memory (ROM), random access memory (RAM), a combination of the two or any type of device that may store information, provides instructions 1479a and data 1481a to the processor 1477. A portion of the memory 1483 may also include non-volatile random access memory (NVRAM). Instructions 1479b and data 1481b may also reside in the processor 1477. Instructions 1479b and/or data 1481b loaded into the processor 1477 may also include instructions 1479a and/or data 1481a from memory 1483 that were loaded for execution or processing by the processor 1477. The instructions 1479b may be executed by the processor 1477 to implement the method 300 described above.

The eNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the eNB 1460 are coupled together by a bus system 1485, which may include a power bus, a control signal bus and a status signal bus, in addition to a data bus. However, for the sake of clarity, the various buses are illustrated in FIG. 14 as the bus system 1485. The eNB 1460 may also include a digital signal processor (DSP) 1487 for use in processing signals. The eNB 1460 may also include a communications interface 1489 that provides user access to the functions of the eNB 1460. The eNB 1460 illustrated in FIG. 14 is a functional block diagram rather than a listing of specific components.

Figure 15:
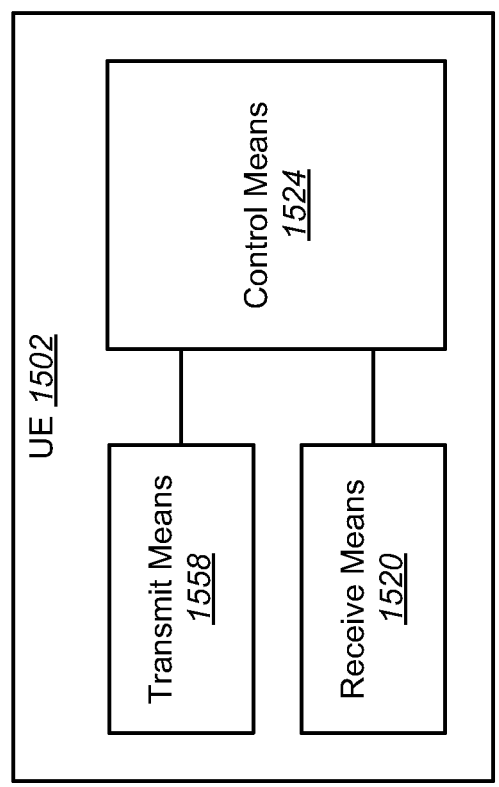
FIG. 15 is a block diagram illustrating one configuration of a wireless communication device in which systems and methods for enabling half-duplex communication may be implemented.

FIG. 15 is a block diagram illustrating one configuration of a wireless communication device 1502 in which systems and methods for enabling half-duplex communication may be implemented. The wireless communication device 1502 includes transmit means 1558, receive means 1520 and control means 1524. The transmit means 1558, receive means 1520 and control means 1524 may be configured to perform one or more of the functions described in connection with FIG. 2 and FIG. 13 above. FIG. 13 above illustrates one example of a concrete apparatus structure of FIG. 15. Other various structures may be implemented to realize one or more of the functions of FIG. 2 and FIG. 13. For example, a DSP may be realized by software.

Figure 16:
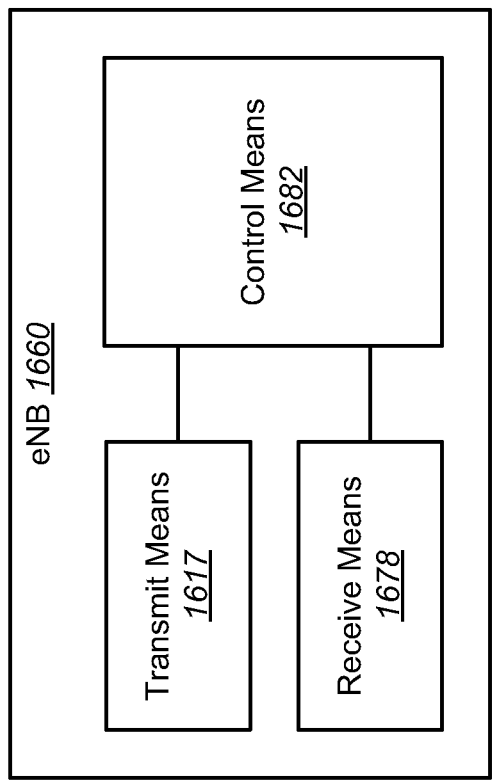
FIG. 16 is a block diagram illustrating one configuration of an eNB in which systems and methods for enabling half-duplex communication may be implemented.

FIG. 16 is a block diagram illustrating one configuration of an eNB 1660 in which systems and methods for enabling half-duplex communication may be implemented. The eNB 1660 includes transmit means 1617, receive means 1678 and control means 1682. The transmit means 1617, receive means 1678 and control means 1682 may be configured to perform one or more of the functions described in connection with FIGS. 3 and 14 above. FIG. 14 above illustrates one example of a concrete apparatus structure of FIG. 16. Other various structures may be implemented to realize one or more of the functions of FIGS. 3 and 14. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A wireless communication device for enabling half-duplex communication, comprising:
   a processor;
   memory in electronic communication with the processor;
   instructions stored in the memory, the instructions being executable to:
      receive an indicator via at least one of the group consisting of radio resource control (RRC) signaling, a broadcast signal and a synchronization signal;
      determine a half-duplex frame structure with a regular uplink (UL) and downlink (DL) switching pattern and corresponding DL and UL association timings based on the indicator, the half-duplex frame structure comprising at least one UL subframe group including one or multiple consecutive UL subframes and at least one DL subframe group including one or multiple consecutive DL subframes;
      receive DL information in at least one of the DL subframes;
      send UL information in at least one of the UL subframes;
      determine an offset value;
      apply the offset to a Physical Downlink Shared Channel (PDSCH) Hybrid Automatic Repeat Request Acknowledgement (HARQ-ACK) association, to a Physical Uplink Shared Channel (PUSCH) scheduling association and to a PUSCH HARQ-ACK association; and
      determine a DL subframe group and a UL subframe group pattern based on the offset applied to the PDSCH HARQ-ACK association, the PUSCH scheduling association and the PUSCH HARQ-ACK association;
   wherein the wireless communication device is a Machine-Type Communication (MTC) device.

2. The wireless communication device of claim 1, wherein the instructions are further executable to monitor a restricted DL subframe set including fewer than all DL subframes in the at least one DL subframe group.

3. The wireless communication device of claim 1, wherein the at least one UL subframe group comprises four UL subframes and the at least one DL subframe group comprises four DL subframes, and wherein the at least one UL subframe group is switched with the at least one DL subframe group, where a fixed 4 millisecond DL and UL association timing is applied on the four continuous subframe group switching pattern.

4. The wireless communication device of claim 1, wherein the instructions are further executable to apply different association timings to form a guard period for DL to UL switching in half-duplex operation.

5. The wireless communication device of claim 1, wherein the UL subframe group includes a different number of subframes than the DL subframe group, and wherein the instructions are further executable to apply a group association mapping.

6. The wireless communication device of claim 1, wherein a half-duplex frame structure periodicity is the same as a radio frame periodicity.

7. The wireless communication device of claim 1, wherein the at least one UL subframe group corresponds to a first carrier and the at least one DL subframe group corresponds to a second carrier that is separate from the first carrier.

8. The wireless communication device of claim 7, wherein at least one of Time-Division Duplexing (TDD) uplink-downlink (UL-DL) configurations 0-6 with one or more corresponding associations is applied for half-duplex operations on a Frequency-Division Duplexing (FDD) cell, in which the DL subframes are defined on the DL carrier, and the UL subframes are defined on the UL carrier.

9. A wireless communication device for enabling half-duplex communication, comprising:
   a processor;
   memory in electronic communication with the processor;
   instructions stored in the memory, the instructions being executable to:
      receive an indicator via at least one of the group consisting of radio resource control (RRC) signaling, a broadcast signal and a synchronization signal;
      determine a half-duplex frame structure with a regular uplink (UL) and downlink (DL) switching pattern and corresponding DL and UL association timings based on the indicator, the half-duplex frame structure comprising at least one UL subframe group including one or multiple consecutive UL subframes and at least one DL subframe group including one or multiple consecutive DL subframes, wherein the at least one UL subframe group corresponds to a first carrier and the at least one DL subframe group corresponds to a second carrier that is separate from the first carrier, wherein the half-duplex frame structure includes at least one convertible subframe based on a range of Time-Division Duplexing (TDD) uplink-downlink (UL-DL) configurations;
      receive DL information in at least one of the DL subframes;
      send UL information in at least one of the UL subframes;
      apply a Physical Downlink Shared Channel (PDSCH) Hybrid Automatic Repeat Request Acknowledgement (HARQ-ACK) association corresponding to a first TDD UL-DL configuration; and
      apply a Physical Uplink Shared Channel (PUSCH) scheduling association and a PUSCH HARQ-ACK association corresponding to a second TDD UL-DL configuration.

10. An evolved Node B (eNB) for enabling half-duplex communication, comprising:
    a processor;
    memory in electronic communication with the processor;
    instructions stored in the memory, the instructions being executable to:
       determine an indicator that indicates a half-duplex frame structure with a regular uplink (UL) and downlink (DL) switching pattern and corresponding DL and UL association timings, the half-duplex frame structure comprising at least one UL subframe group including one or multiple consecutive UL subframes and at least one DL subframe group including one or multiple consecutive DL subframes, wherein the at least one UL subframe group corresponds to a first carrier and the at least one DL subframe group corresponds to a second carrier that is separate from the first carrier;

send the indicator via at least one of the group consisting of radio resource control (RRC) signaling, a broadcast signal and a synchronization signal, wherein the indicator is sent to a Machine-Type Communication (MTC) device;

receive UL information in at least one of the UL subframes; and send DL information in at least one of the DL subframes;

wherein at least one of Time-Division Duplexing (TDD) uplink-downlink (UL-DL) configurations 0-6 with one or more corresponding associations is applied for half-duplex operations on a Frequency-Division Duplexing (FDD) cell, in which the DL subframes are defined on the DL carrier, and the UL subframes are defined on the UL carrier.

11. The eNB of claim 10, wherein the at least one UL subframe group comprises four UL subframes and the at least one DL subframe group comprises four DL subframes, and wherein the at least one UL subframe group is switched with the at least one DL subframe group, where a fixed 4 millisecond DL and UL association timing is applied on the four continuous subframe group switching pattern.

12. The eNB of claim 10, wherein the instructions are further executable to send one or more offsets.

13. The eNB of claim 10, wherein the UL subframe group includes a different number of subframes than the DL subframe group, and wherein the instructions are further executable to apply a group association mapping.

14. The eNB of claim 10, wherein a half-duplex frame structure periodicity is the same as a radio frame periodicity.

15. An evolved Node B (eNB) for enabling half-duplex communication, comprising:
a processor;
memory in electronic communication with the processor;
instructions stored in the memory, the instructions being executable to:
determine an indicator that indicates a half-duplex frame structure with a regular uplink (UL) and downlink (DL) switching pattern and corresponding DL and UL association timings, the half-duplex frame structure comprising at least one UL subframe group including one or multiple consecutive UL subframes and at least one DL subframe group including one or multiple consecutive DL subframes, wherein the at least one UL subframe group corresponds to a first carrier and the at least one DL subframe group corresponds to a second carrier that is separate from the first carrier, wherein the half-duplex frame structure includes at least one convertible subframe based on a range of Time-Division Duplexing (TDD) uplink-downlink (UL-DL) configurations;
send the indicator via at least one of the group consisting of radio resource control (RRC) signaling, a broadcast signal and a synchronization signal;
receive UL information in at least one of the UL subframes;
send DL information in at least one of the DL subframes;
apply a Physical Downlink Shared Channel (PDSCH) Hybrid Automatic Repeat Request Acknowledgement (HARQ-ACK) association corresponding to a first TDD UL-DL configuration; and
apply a Physical Uplink Shared Channel (PUSCH) scheduling association and a PUSCH HARQ-ACK association corresponding to a second TDD UL-DL configuration.

16. A method for enabling half-duplex communication on a wireless communication device, comprising:

receiving an indicator via at least one of the group consisting of radio resource control (RRC) signaling, a broadcast signal and a synchronization signal;

determining a half-duplex frame structure with a regular uplink (UL) and downlink (DL) switching pattern and corresponding DL and UL association timings based on the indicator, the half-duplex frame structure comprising at least one UL subframe group including one or multiple consecutive UL subframes and at least one DL subframe group including one or multiple consecutive DL subframes;

receiving DL information in at least one of the DL subframes;

sending UL information in at least one of the UL subframes;

determining an offset value;

applying the offset to a Physical Downlink Shared Channel (PDSCH) Hybrid Automatic Repeat Request Acknowledgement (HARQ-ACK) association, to a Physical Uplink Shared Channel (PUSCH) scheduling association and to a PUSCH HARQ-ACK association; and determining a DL subframe group and a UL subframe group pattern based on the offset applied to the PDSCH HARQ-ACK association, the PUSCH scheduling association and the PUSCH HARQ-ACK association;

wherein the wireless communication device is a Machine-Type Communication (MTC) device.

17. The method of claim 16, further comprising monitoring a restricted DL subframe set including fewer than all DL subframes in the at least one DL subframe group.

18. The method of claim 16, wherein the at least one UL subframe group comprises four UL subframes and the at least one DL subframe group comprises four DL subframes, and wherein the at least one UL subframe group is switched with the at least one DL subframe group, where a fixed 4 millisecond DL and UL association timing is applied on the four continuous subframe group switching pattern.

19. The method of claim 16, further comprising applying different association timings to form a guard period for DL to UL switching in half-duplex operation.

20. The method of claim 16, wherein the UL subframe group includes a different number of subframes than the DL subframe group, and wherein the method further comprises applying a group association mapping.

21. The method of claim 16, wherein a half-duplex frame structure periodicity is the same as a radio frame periodicity.

22. The method of claim 16, wherein the at least one UL subframe group corresponds to a first carrier and the at least one DL subframe group corresponds to a second carrier that is separate from the first carrier.

23. The method of claim 22, wherein at least one of Time-Division Duplexing (TDD) uplink-downlink (UL-DL) configurations 0-6 with one or more corresponding associations is applied for half-duplex operations on a Frequency-Division Duplexing (FDD) cell, in which the DL subframes are defined on the DL carrier, and the UL subframes are defined on the UL carrier.

24. A method for enabling half-duplex communication on a wireless communication device, comprising:

receiving an indicator via at least one of the group consisting of radio resource control (RRC) signaling, a broadcast signal and a synchronization signal;

determining a half-duplex frame structure with a regular uplink (UL) and downlink (DL) switching pattern and corresponding DL and UL association timings based on the indicator, the half-duplex frame structure comprising at least one UL subframe group including one or multiple consecutive UL subframes and at least one DL subframe group including one or multiple consecutive DL subframes, wherein the at least one UL subframe group corresponds to a first carrier and the at least one DL subframe group corresponds to a second carrier that is separate from the first carrier, wherein the half-duplex frame structure includes at least one convertible subframe based on a range of Time-Division Duplexing (TDD) uplink-downlink (UL-DL) configurations;

receiving DL information in at least one of the DL subframes;

sending UL information in at least one of the UL subframes;

applying a Physical Downlink Shared Channel (PDSCH) Hybrid Automatic Repeat Request Acknowledgement (HARQ-ACK) association corresponding to a first TDD UL-DL configuration; and applying a Physical Uplink Shared Channel (PUSCH) scheduling association and a PUSCH HARQ-ACK association corresponding to a second TDD UL-DL configuration.

25. A method for enabling half-duplex communication on an evolved Node B (eNB), comprising:

determining an indicator that indicates a half-duplex frame structure with a regular uplink (UL) and downlink (DL) switching pattern and corresponding DL and UL association timings, the half-duplex frame structure comprising at least one UL subframe group including one or multiple consecutive UL subframes and at least one DL subframe group including one or multiple consecutive DL subframes, wherein the at least one UL subframe group corresponds to a first carrier and the at least one DL subframe group corresponds to a second carrier that is separate from the first carrier;

sending the indicator via at least one of the group consisting of radio resource control (RRC) signaling, a broadcast signal and a synchronization signal, wherein the indicator is sent to a Machine-Type Communication (MTC) device;

receiving UL information in at least one of the UL subframes; and sending DL information in at least one of the DL subframes;

wherein at least one of Time-Division Duplexing (TDD) uplink-downlink (UL-DL) configurations 0-6 with one or more corresponding associations is applied for half-duplex operations on a Frequency-Division Duplexing (FDD) cell, in which the DL subframes are defined on the DL carrier, and the UL subframes are defined on the UL carrier.

26. The method of claim 25, wherein the at least one UL subframe group comprises four UL subframes and the at least one DL subframe group comprises four DL subframes, and wherein the at least one UL subframe group is switched with the at least one DL subframe group, where a fixed 4 millisecond DL and UL association timing is applied on the four continuous subframe group switching pattern.

27. The method of claim 25, further comprising sending one or more offsets.

28. The method of claim 25, wherein the UL subframe group includes a different number of subframes than the DL subframe group, and wherein the method further comprises applying a group association mapping.

29. The method of claim 25, wherein a half-duplex frame structure periodicity is the same as a radio frame periodicity.

30. A method for enabling half-duplex communication on an evolved Node B (eNB), comprising:

determining an indicator that indicates a half-duplex frame structure with a regular uplink (UL) and downlink (DL) switching pattern and corresponding DL and UL association timings, the half-duplex frame structure comprising at least one UL subframe group including one or multiple consecutive UL subframes and at least one DL subframe group including one or multiple consecutive DL subframes, wherein the at least one UL subframe group corresponds to a first carrier and the at least one DL subframe group corresponds to a second carrier that is separate from the first carrier, wherein the half-duplex frame structure includes at least one convertible subframe based on a range of Time-Division Duplexing (TDD) uplink-downlink (UL-DL) configurations;

sending the indicator via at least one of the group consisting of radio resource control (RRC) signaling, a broadcast signal and a synchronization signal;

receiving UL information in at least one of the UL subframes;

sending DL information in at least one of the DL subframes;

applying a Physical Downlink Shared Channel (PDSCH) Hybrid Automatic Repeat Request Acknowledgement (HARQ-ACK) association corresponding to a first TDD UL-DL configuration; and applying a Physical Uplink Shared Channel (PUSCH) scheduling association and a PUSCH HARQ-ACK association corresponding to a second TDD UL-DL configuration.

* * * * *